(12) United States Patent
Iyengar et al.

(10) Patent No.: US 11,914,050 B2
(45) Date of Patent: Feb. 27, 2024

(54) POLARIZATION CONFIGURABLE GNSS SMARTPHONE ANTENNA

(71) Applicant: QUALCOMM Incorporated, San Diego, CA (US)

(72) Inventors: Pranav Iyengar, San Diego, CA (US); Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 17/198,151

(22) Filed: Mar. 10, 2021

(65) Prior Publication Data

US 2022/0291395 A1 Sep. 15, 2022

(51) Int. Cl.
*G01S 19/36* (2010.01)
*G01S 19/32* (2010.01)
*G01S 19/37* (2010.01)
*H04B 1/52* (2015.01)
(Continued)

(52) U.S. Cl.
CPC .............. *G01S 19/36* (2013.01); *G01S 19/32* (2013.01); *G01S 19/37* (2013.01); *H01Q 9/42* (2013.01); *H04B 1/52* (2013.01); *H04B 1/58* (2013.01)

(58) Field of Classification Search
CPC .............. H04B 1/52; H04B 1/58; G01S 19/32
See application file for complete search history.

(56) References Cited

U.S. PATENT DOCUMENTS 6,356,771 B1    3/2002  Dent
6,442,371 B1 *  8/2002  Lyu ................... H04B 17/0085
                                                455/67.14
(Continued)

FOREIGN PATENT DOCUMENTS

EP    1198078 A2    4/2002
EP    1491910 A1    12/2004
(Continued)

OTHER PUBLICATIONS

International Search Report and Written Opinion—PCT/US2022/070105—ISA/EPO—dated Aug. 5, 2022.
(Continued)

*Primary Examiner* — Ricardo I Magallanes
(74) *Attorney, Agent, or Firm* — QUALCOMM Incorporated

(57) ABSTRACT

A Global Navigation Satellite System (GNSS) receiver for a portable device includes a first linear polarization antenna configured to receive a first linear polarization component of a GNSS signal; a second linear polarization antenna configurable to receive a second linear polarization component of the GNSS signal, a radio frequency signal conforming to a second wireless communication technology, or both; and a hybrid coupler that combines the first linear polarization component of the GNSS signal and the second linear polarization component of the GNSS signal to generate a circularly polarized GNSS signal. In some embodiments, the GNSS receiver includes a tuner to tune the resonant frequency of the second linear polarization antenna. In some embodiments, the GNSS receiver includes a switch or a filter to connect or disconnect the second linear polarization antenna from the hybrid coupler to implement a circular polarization antenna or a linear polarization ante.

19 Claims, 12 Drawing Sheets

(51) Int. Cl.
  *H04B 1/58* (2006.01)
  *H01Q 9/42* (2006.01)

(56) References Cited

U.S. PATENT DOCUMENTS

| | | | | |
|---|---|---|---|---|
| 6,609,013 | B1* | 8/2003 | Oh | H04W 52/42 |
| | | | | 455/562.1 |
| 6,778,843 | B2* | 8/2004 | Oura | H04B 1/40 |
| | | | | 455/562.1 |
| 7,505,009 | B2* | 3/2009 | Parsche | H01Q 7/00 |
| | | | | 343/742 |
| 9,176,233 | B2* | 11/2015 | Khalili | G01S 19/32 |
| 9,716,541 | B2* | 7/2017 | Sanderovich | H04W 24/02 |
| 10,638,268 | B2* | 4/2020 | Xing | G01S 5/14 |
| 10,651,920 | B1* | 5/2020 | Struhsaker | H04B 7/0469 |
| 2002/0045427 | A1* | 4/2002 | Lahti | H04B 7/0848 |
| | | | | 455/97 |
| 2004/0029549 | A1 | 2/2004 | Fikart | |
| 2006/0087385 | A1 | 4/2006 | Fitzpatrick et al. | |
| 2012/0162012 | A1 | 6/2012 | Marzouki et al. | |
| 2014/0210678 | A1 | 7/2014 | Chen et al. | |
| 2016/0139271 | A1 | 5/2016 | Chamseddine | |
| 2016/0181704 | A1* | 6/2016 | Orban | H01Q 9/0442 |
| | | | | 343/853 |
| 2017/0141471 | A1 | 5/2017 | Taachouche et al. | |
| 2017/0149294 | A1* | 5/2017 | Wight | H02J 50/20 |
| 2017/0254901 | A1 | 9/2017 | Kim | |
| 2017/0317402 | A1* | 11/2017 | Hwang | H01Q 9/045 |
| 2018/0331714 | A1* | 11/2018 | See | H04B 7/0814 |
| 2019/0319342 | A1 | 10/2019 | Apostolos et al. | |
| 2020/0229010 | A1 | 7/2020 | Soriaga et al. | |
| 2020/0388923 | A1* | 12/2020 | Leung | H01Q 5/48 |
| 2021/0282097 | A1* | 9/2021 | Imana | H04W 52/42 |
| 2022/0393761 | A1* | 12/2022 | Comin | G02B 26/0875 |
| 2023/0096975 | A1 | 3/2023 | Pon et al. | |

FOREIGN PATENT DOCUMENTS

| | | | | |
|---|---|---|---|---|
| EP | 2608316 | A1 * | 6/2013 | H01Q 21/245 |
| EP | 3217477 | A1 | 9/2017 | |
| EP | 3842837 | A2 | 6/2021 | |
| JP | H07254816 | A | 10/1995 | |

OTHER PUBLICATIONS

Partial International Search Report—PCT/US2022/070105—ISA/EPO—dated May 20, 2022.

Anaren Xinger, "Ultra Low Profile 0805 3 dB, 90° Hybrid Coupler", Model C0727J5003AHF, Rev. B., www.anaren.com, 5 pages.

Moubadir M., et al., "A New Circular Polarization Dual Feed Microstrip Square Patch Antenna Using Branch Coupler Feeds for WLAN/HIPERLAN Applications", The 12th International Conference Interdisciplinarity in Engineering, ScienceDirect, Procedia Manufacturing 32, Apr. 2019, pp. 702-709, www.sciencedirect.com.

* cited by examiner

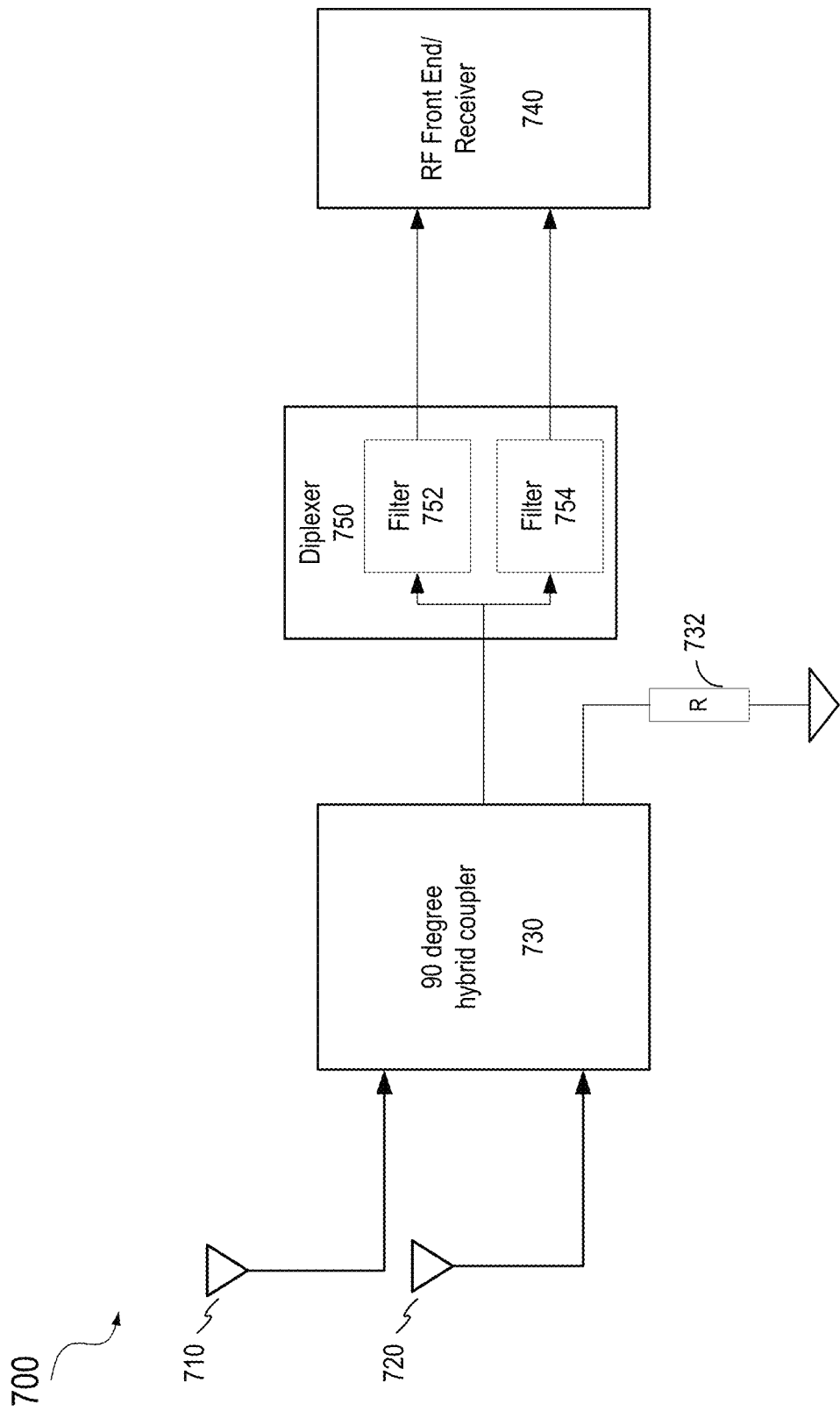

POLARIZATION CONFIGURABLE GNSS SMARTPHONE ANTENNA

BACKGROUND

Obtaining reliable, accurate locations of mobile devices or systems can be useful for many applications, such as emergency handling, personal navigation, autonomous driving, asset tracking, locating a friend or family member, and the like. Mobile device positioning techniques include measuring radio signals transmitted from a variety of devices or entities, including Satellite Vehicles (SVs) and terrestrial radio sources in a wireless network such as base stations and access points. For example, modern electronic devices frequently include systems that can receive signals from satellite navigation systems, commonly referred to as Global Navigation Satellite Systems (each a "GNSS"), and use the satellite signals to determine the location of the devices and other information, such as speed, heading, altitude, and the like. GNSS receivers may be integrated into portable consumer electronic devices, such as smartphones or smartwatches, as well as into navigation systems in various types of vehicles, such as cars, trucks, ships, aircraft, and drones. Signals from multiple satellites orbiting the earth may be received and processed by a GNSS receiver to determine the location of the GNSS receiver and, by proxy, the location of the device, vehicle, user, and the like.

SUMMARY

Techniques disclosed herein relate generally to Global Navigation Satellite System (GNSS) antennas, and, more specifically, to circular polarization and polarization configurable GNSS antennas for smartphone or other portable devices. Various inventive embodiments are described herein, including devices, systems, components, apparatuses, methods, procedures, instructions, code, computer storage medium, and the like.

According to certain embodiments, a GNSS receiver for a portable device (e.g., a smartphone) may include a first linear polarization antenna configured to receive a first linear polarization component of a GNSS signal (i.e., radio frequency signal conforming to a first wireless communication technology); a second linear polarization antenna configurable to receive a second linear polarization component of the GNSS signal, a radio frequency signal conforming to a second wireless communication technology, or both; and a hybrid coupler. The hybrid coupler may include a first port electrically coupled to the first linear polarization antenna, a second port electrically coupled to the second linear polarization antenna, and a third port outputting a combined GNSS signal of the first linear polarization component of the GNSS signal and the second linear polarization component of the GNSS signal, where a difference between a phase delay from the second port to the third port and a phase delay from the first port to the third port is between about 60° and about 120°.

In some embodiments of the GNSS receiver, the first linear polarization antenna and the second linear polarization antenna may be planar inverted F antennas. The first linear polarization antenna may also be configured to receive a radio frequency signal conforming to a third wireless communication technology, and the GNSS receiver may include a demultiplexing circuit coupled to the first linear polarization antenna and configured to separate the first linear polarization component of the GNSS signal and the radio frequency signal conforming to the third wireless communication technology. The demultiplexing circuit may include, for example, an n-plexer with n greater than one. In one example, the demultiplexing circuit may include a first bandpass filter configured to select the first linear polarization component of the GNSS signal and a second bandpass filter configured to select the radio frequency signal conforming to the third wireless communication technology.

In some embodiments of the GNSS receiver, the second linear polarization antenna may include a tuner configured to tune a resonant frequency of the second linear polarization antenna to receive the second linear polarization component of the GNSS signal, the radio frequency signal conforming to the second wireless communication technology, or both. The tuner may include, for example, an aperture tuner or an impedance tuner. In some embodiments, the GNSS receiver may include a switch between the second linear polarization antenna and the second port of the hybrid coupler to connect or disconnect the second linear polarization antenna and the hybrid coupler. In some embodiments, the GNSS receiver may include an n-plexer between the second linear polarization antenna and the second port of the hybrid coupler to separate the second linear polarization component of the GNSS signal and the radio frequency signal conforming to the second wireless communication technology and then send the second linear polarization component of the GNSS signal to the second port of the hybrid coupler. In some embodiments, the GNSS receiver may include an n-plexer coupled to the third port of the hybrid coupler and configured to separate GNSS L1 signals and GNSS L5 signals.

The second wireless communication technology may include, for example, a wireless wide area network (WWAN) technology, a wireless local area network (WLAN) technology, or a wireless personal area network (WPAN) technology. In some embodiments, the first linear polarization antenna may include a vertical linear polarization antenna, and the second linear polarization antenna may include a horizontal linear polarization antenna. The third port of the hybrid coupler may output a right-handed circularly polarized GNSS signal.

According to certain embodiments, a method may include receiving a first linear polarization component of a GNSS signal by a first antenna of a portable device, tuning a second antenna of the portable device to a GNSS band, receiving a second linear polarization component of the GNSS signal by the tuned second antenna, and combining the first linear polarization component of the GNSS signal and the second linear polarization component of the GNSS signal by a hybrid coupler (e.g., a hybrid coupler with a nominal phase shift of 90°) to generate a combined GNSS signal (e.g., a circularly polarized GNSS signal).

In some embodiments, the method may also include tuning the second antenna to a frequency band for a second wireless communication technology that is different from GNSS technology, disconnecting the second antenna from the hybrid coupler by a switch or a filter, and feeding the combined GNSS signal or the first linear polarization component of the GNSS signal to a radio frequency front end circuit of the portable device. The second wireless communication technology may include, for example, a wireless wide area network (WWAN) technology, a wireless local area network (WLAN) technology, or a wireless personal area network (WPAN) technology.

In some embodiments, tuning the second antenna may include tuning the second antenna to receive both the second linear polarization component of the GNSS signal and a radio frequency signal conforming to a second wireless communication technology, and the method may include separating the second linear polarization component of the GNSS signal and the radio frequency signal conforming to the second wireless communication technology.

In some embodiments, the method may include receiving a radio frequency signal conforming to a third wireless communication technology by the first antenna, and separating the first linear polarization component of the GNSS signal and the radio frequency signal conforming to the third wireless communication technology. The third wireless communication technology may include, for example, a wireless wide area network (WWAN) technology, a wireless local area network (WLAN) technology, or a wireless personal area network (WPAN) technology.

In some embodiments, combining the first linear polarization component of the GNSS signal and the second linear polarization component of the GNSS signal may include delaying the second linear polarization component of the GNSS signal by a phase delay within+90±30° or within−90±30° with respect to the first linear polarization component of the GNSS signal. In some embodiments, the method may include automatically switching, based on an environment condition, an operating condition, or both of the portable device, a switch between the second antenna and the hybrid coupler to connect or disconnect the second antenna and the hybrid coupler.

In some embodiments, the method may include disconnecting the second antenna from the hybrid coupler, measuring a first set of one or more GNSS signals using the first antenna, connecting the second antenna to the hybrid coupler, measuring a second set of one or more GNSS signals using the first antenna and the second antenna, and identifying a GNSS signal in the first set of one or more GNSS signals but not in the second set of one or more GNSS signals as a multipath GNSS signal. In some embodiments, the method may also include identifying a first satellite associated with the multipath GNSS signal. In some embodiments, the method may further include disconnecting the second antenna from the hybrid coupler, measuring a third set of GNSS signals that includes a GNSS signal from the first satellite using the first antenna, and determining a location fix based on the third set of GNSS signals excluding the GNSS signal from the first satellite.

According to certain embodiments, a portable device may include means for receiving a first linear polarization component of a GNSS signal, means for tuning an antenna of the portable device to a GNSS band to receive a second linear polarization component of the GNSS signal, and means for combining the first linear polarization component of the GNSS signal and the second linear polarization component of the GNSS signal to generate a circularly polarized GNSS signal.

In some embodiments, the portable device may also include means for tuning the antenna to a frequency band for a second wireless communication technology, means for disconnecting the antenna from the means for combining the first linear polarization component of the GNSS signal and the second linear polarization component of the GNSS signal, and means for feeding the first linear polarization component of the GNSS signal or the circularly polarized GNSS signal to a radio frequency front end circuit of the portable device. In some embodiments, the second wireless communication technology may include a wireless wide area network (WWAN) technology, a wireless local area network (WLAN) technology, or a wireless personal area network (WPAN) technology.

In some embodiments, the means for tuning the antenna may include means for tuning the antenna to both the GNSS band and a frequency band for a second wireless communication technology, and the portable device may further include means for separating the second linear polarization component of the GNSS signal and a radio frequency signal conforming to the second wireless communication technology. In some embodiments, the means for receiving the first linear polarization component of the GNSS signal may further be configured to receive a radio frequency signal conforming to a second wireless communication technology, and the portable device may include means for separating the first linear polarization component of the GNSS signal and the radio frequency signal conforming to the second wireless communication technology.

According to certain embodiments, a GNSS receiver may include a first linear polarization antenna configured to receiver a first linear polarization component of a GNSS signal, a second linear polarization antenna, a tuner configurable to tune the second linear polarization antenna to a GNSS band to receive a second linear polarization component of the GNSS signal, and a hybrid coupler (e.g., a 90° hybrid coupler) configured to combine the first linear polarization component of the GNSS signal and the second linear polarization component of the GNSS signal to generate a circularly polarized GNSS signal.

In some embodiments of the GNSS receiver, the tuner may be configurable to tune the second linear polarization antenna to a frequency band for a second wireless communication technology, and the GNSS receiver may include a switch or a filter configured to disconnect the second linear polarization antenna from the hybrid coupler.

In some embodiments, the tuner may be configurable to tune the second linear polarization antenna to receive both the second linear polarization component of the GNSS signal and a radio frequency signal conforming to a second wireless communication technology, and the GNSS receiver may include an n-plexer configured to separate the second linear polarization component of the GNSS signal and the radio frequency signal conforming to the second wireless communication technology.

In some embodiments, the first linear polarization antenna may be configured to receive a radio frequency signal conforming to a second wireless communication technology, and the GNSS receiver may include an n-plexer configured to separate the first linear polarization component of the GNSS signal and the radio frequency signal conforming to the second wireless communication technology.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures.

FIG. 7 illustrates another example of a circular polarization GNSS antenna according to certain embodiments.

Figure 1:
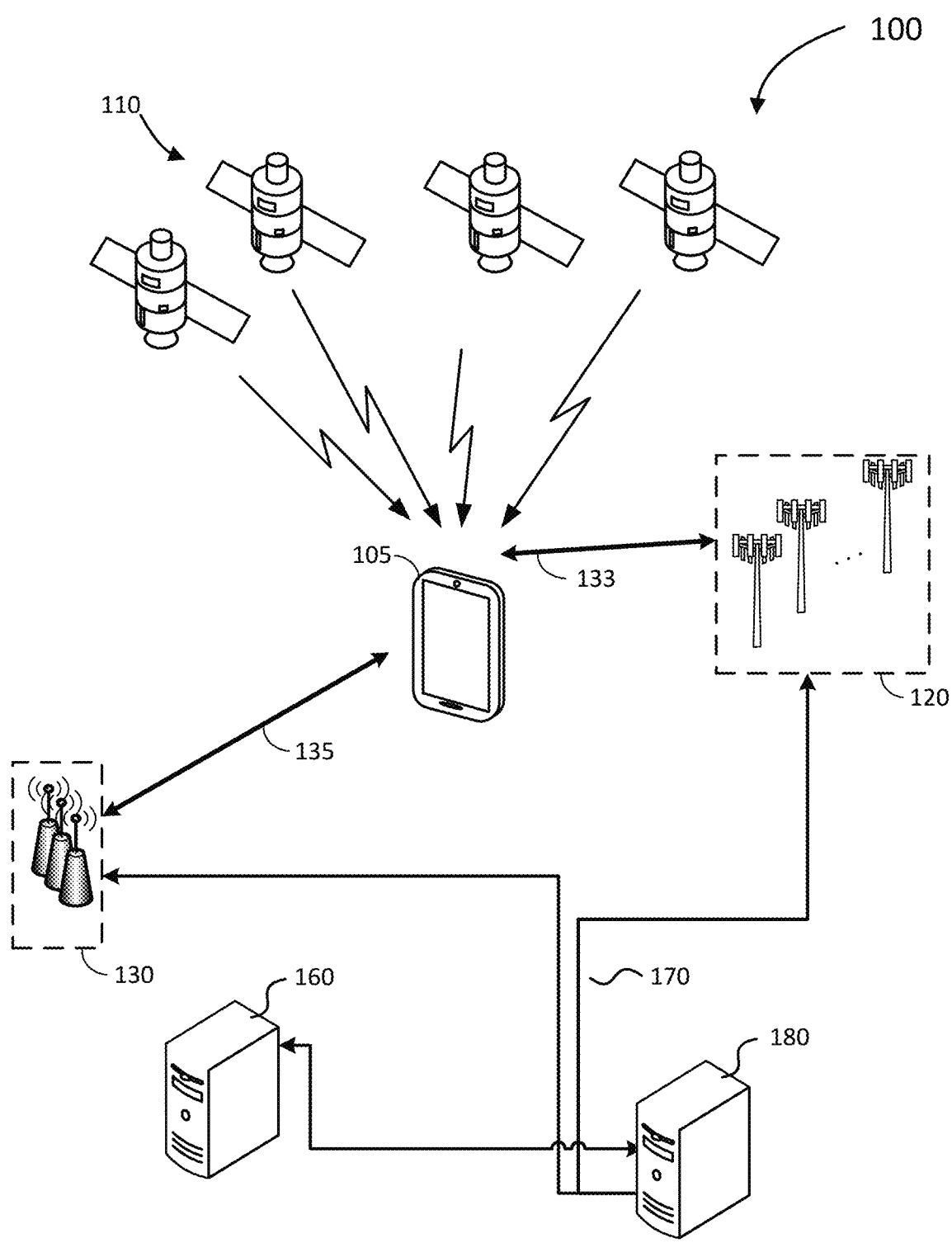
FIG. 1 is a simplified diagram of an example of a positioning system according to certain embodiments.

In the figures, like reference numerals refer to like parts throughout various figures unless otherwise specified. In addition, multiple instances of a component may be distinguished by following the reference numeral by a second label (e.g., a letter or a number), or a dash and a second label. If only the first reference label is used in the specification, the description is applicable to any one of the similar components having the same first reference numeral irrespective of the second label.

DETAILED DESCRIPTION

Techniques disclosed herein relate generally to Global Navigation Satellite System (GNSS) antennas, and, more specifically, to circular polarization and polarization configurable GNSS antennas for smartphone or other portable devices. Various inventive embodiments are described herein, including devices, systems, components, apparatuses, methods, procedures, instructions, code, computer-readable storage medium, and the like.

More and more users around the world are relying on mobile navigation services because knowing the location of a moving object, such as a mobile device or system, can be very useful for many applications and/or in many circumstances, such as emergency calls, personal navigation, autonomous driving, asset tracking, locating a person, and the like. Many mobile electronic devices include systems that can receive satellites signals from GNSS systems, and use the satellite signals to determine the location of the devices and other information, such as speed, heading, altitude, and the like. GNSS receivers may be integrated into consumer electronic devices, such as smartphones or smartwatches. Signals from multiple satellites orbiting the earth may be received and processed by a GNSS receiver to determine the location of the GNSS receiver based on the known location of the multiple satellites and the distance between the GNSS receiver and each of the multiple satellites.

GNSS satellites, such as Global Positioning System (GPS) satellites, generally employ right-hand circular polarization (RHCP) to transmit signals to earth. In smartphones, planar inverted F antennas (PIFAs) are generally used to receive GNSS signals because PIFAs can be made to conform to the industrial design and fit in the compact design of smartphones or other portable devices. However, the PIFAs in smartphones is generally linear polarization antennas. Since the GNSS signal transmitted by satellites is right hand circular polarized while the receiving PIFA antenna is a linear polarization antenna, there may be as much as a 3 dB loss in the signal level due to the polarization mismatch. In addition, in multipath environments, with each reflection, the polarization of the satellite signal changes from RHCP to left-handed circular polarization (LHCP) or vice versa. Therefore, the satellite signals may be RHCP signals if the satellite signals are not reflected or if the satellite signals are reflected an even number of times, and may become LHCP signals if the satellite signals are reflected an odd number of times. In some cases, the reflected GNSS signals may become elliptical polarization signals or signals of other polarization states. Thus, the term "GNSS signal" used herein refers to any radio frequency signal conforming to the GNSS technology and having any polarization state, including linear polarization, circular polarization, elliptical polarization, or unpolarized state. The line-of-sight signal and the reflected signal may both be received by the GNSS receiver but may not be in phase. A linear polarization antenna may not be able to distinguish the line-of-sight signal and the reflected signal that may contribute to positioning errors.

RHCP GNSS antennas can more efficiently receive the RHCP GNSS signals with little loss caused by polarization mismatch. In addition, RHCP GNSS antennas may reject a reflected GNSS signal that may be LHCP due to the reflection. Therefore, right-hand circularly polarized antennas are less susceptible to multipath signals, as compared to linearly polarized antennas which can accept both right- and left-handed circularly polarized signals.

However, designing a circular polarization antenna for use in smartphones can be difficult due to the physical dimension and printed circuit board (PCB) area limitations, PCB shape constraints (e.g., driven by industrial design, battery size, etc.), and the limited freedom in antenna placement. Most smartphones have a multi-layer PCB with multiple layers of metal planes (e.g., copper). Integrated circuits (ICs) placed on the PCB and interconnection traces routed on the PCB may use certain copper cutouts. Due to these restrictions, it can be very difficult to modify the ground plane and excite the currents on it to achieve circular polarization with an axial ratio close to 0 dB. For example, even though RHCP antennas may be formed using a patch antenna, the area used for the patch antenna and the ground clearance on the PCB for the patch antenna may not be practical in smartphone designs.

According to certain embodiments, a GNSS antenna in a smartphone or another portable device (e.g., a smart watch) may include two or more linear antennas (e.g., PIFAs) and a hybrid coupler coupled to the two or more linear antennas. The phase shift of the hybrid coupler may be any suitable value, such as any value between about 90°±60°, between about 90°±45°, between about 90°±30°, between about 90°±15°, between about 90°±10°, or between about 90°±5°. In one example, the nominal phase shift of the hybrid coupler may be 90° (which may be referred to as a 90° hybrid coupler or combiner), where the actual phase shift may be, for example, between about 90°±45°, between about 90°±30°, between about 90°±15°, between about 90°±10°, between about 90°±5°, or between about 90°±2°. The 90° hybrid coupler may combine the linear polarization signals received by two linear antennas, which may already be used in the smartphone for other purposes (e.g., cellular communications or other wireless communications), to implement a RHCP GNSS antenna with improved signal power (e.g., by about 3 dB) and multipath rejection. In some embodiments, the two or more antennas may be tuned to optimize the antenna usage. For example, the two or more antennas may be dynamically configured and/or tuned to become RHCP (for receiving the RHCP GNSS signals) or to maintain linear polarization, thus allowing the user to select the operational mode based on the environment and desired accuracy. As a result, the GNSS receiver may be able to determine a position fix with good accuracy in many conditions using a linear polarization antenna, and may be able to achieve a more accurate position fix in a more open/favorable environment by replicating a circular polarization antenna.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (or UT), a "mobile device," a "mobile terminal," a "mobile station," or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), and the like. In NR systems, the term "cell" and next generation NodeB (gNB), new radio base station (NR BS), 5G NB, access point (AP), or transmission reception point (TRP) may be used interchangeably. A base station may be used primarily to support wireless access by UEs, including supporting data, voice, and/or signaling connections for the supported UEs. In some systems, a base station may provide purely edge node signaling functions, while in other systems, a based station may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein, the term traffic channel (TCH) can refer to either an uplink/reverse or downlink/forward traffic channel.

In some embodiments, the term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency range that transports information through the space between a transmitter and a receiver. As used herein, a transmitter may transmit a single RF signal or multiple RF signals to a receiver. However, the receiver may receive multiple RF signals corresponding to each transmitted RF signal due to the propagation characteristics of RF signals through multipath channels. The same transmitted RF signal on different paths between the transmitter and receiver may be referred to as a multipath RF signal. As used herein, an RF signal may also be referred to as a "wireless signal" or simply a "signal" where it is clear from the context that the term "signal" refers to a wireless signal or an RF signal.

A "space vehicle" or "SV," as referred to herein, relates to an object that is capable of transmitting signals to receivers on the earth's surface. In one particular example, such a SV may comprise a geostationary satellite. Alternatively, a SV may comprise a satellite traveling in an orbit and moving relative to a stationary position on the earth. However, these are merely examples of SVs and claimed subject matter is not limited in these respects.

A "location," as referred to herein, relates to information associated with a whereabouts of an object or thing according to a point of reference. For example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects. A "location" is also referred to herein as a "location estimate", "estimated location", "location", "position", "position estimate", "position fix", "estimated position", "location fix", or "fix".

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified diagram of an example of a positioning system 100 according to certain embodiments. In positioning system 100, a UE 105, a location server 160, and/or other components of positioning system 100 can use techniques provided herein for determining an estimated location of UE 105. An estimated location of UE 105 can be used in a variety of applications, such as to assist direction finding or navigation for a user of UE 105 or to assist another user (e.g., associated with an external client 180) to locate UE 105. A location of UE 105 may include an absolute location of UE 105 (e.g., a latitude and longitude and possibly altitude) or a relative location of UE 105, such as a location expressed as distances north or south, east or west and possibly above or below some other known fixed locations or some other locations such as a location for UE 105 at some known previous time. A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., a 95% confidence level).

In this example, FIG. 1 illustrates UE 105 as a smartphone device. However, UEs may be any suitable device that includes GNSS capabilities, or may be a device or machine with such GNSS functionality integrated into it. For example, UE 105 may include personal devices such as a smartphone, smartwatch, tablet, laptop, and the like. However, UEs may include a larger class of device as well and may include vehicles with integrated GNSS receivers and positioning systems, such as boats, ships, cars, trucks, aircraft, drones, and the like.

Positioning system 100 can include UE 105, one or more GNSS satellites 110 (also referred to as space vehicles (SVs)) for a Global Navigation Satellite System (GNSS) such as the Global Positioning System (GPS), base stations 120, access points (APs) 130, a location server 160, a network 170, and an external client 180. In general, positioning system 100 can estimate location of UE 105 based on RF signals received by and/or sent from UE 105 and known locations of other components (e.g., GNSS satellites 110, base stations 120, or APs 130) transmitting and/or receiving the RF signals. Additional details regarding particular location estimation techniques are discussed in more detail below.

FIG. 1 provides a generalized illustration of various components, any or all of which may be utilized as appropriate, and each of which may be duplicated as needed. Specifically, although only one UE 105 is illustrated, it will be understood that many UEs (e.g., hundreds, thousands, millions, etc.) may utilize positioning system 100. Similarly, positioning system 100 may include a larger or smaller number of base stations 120 and/or APs 130 than illustrated in FIG. 1. The illustrated connections that connect the various components in positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, external client 180 may be directly connected to location server 160. A person of ordinary skill in the art will recognize many modifications to the components illustrated.

Depending on the desired functionality, network 170 may include any of a variety of wireless and/or wireline networks. Network 170 can include, for example, any combination of public and/or private networks, local and/or wide-area networks, and the like. Furthermore, network 170 may utilize one or more wired and/or wireless communication technologies. In some embodiments, network 170 may include, for example, a cellular or other mobile network, a wireless local area network (WLAN, e.g., WiFi), a wireless wide-area network (WWAN, such as GSM, CDMA, LTE, 5G NE, or WiMAX), and/or the Internet. Examples of network 170 include an LTE wireless network, 5G NR wireless network, a Wi-Fi WLAN, and the Internet. LTE, 5G and NR are wireless technologies defined, or being defined, by the 3rd Generation Partnership Project (3GPP). As used herein, the terms "5G NR," "5G," and "NR" are used interchangeably to refer to these wireless technologies. Network 170 may also include more than one network and/or more than one type of network.

Base stations 120 and access points (APs) 130 are communicatively coupled to network 170. In some embodiments, base station 120s may be owned, maintained, and/or operated by a cellular network provider, and may employ any of a variety of wireless technologies, as described herein below. Depending on the technology of network 170, base station 120 may include a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5G CN) in the case that Network 170 is a 5G network. An AP 130 may include, for example, a Wi-Fi AP or a Bluetooth® AP. Thus, UE 105 can send and receive information with network-connected devices, such as location server 160, by accessing network 170 via base station 120 using a first communication link 133. Additionally or alternatively, because APs 130 may also be communicatively coupled with network 170, UE 105 may communicate with Internet-connected devices, including location server 160, using a second communication link 135.

Location server 160 may comprise a server and/or another computing device configured to determine an estimated location of UE 105 and/or provide data (e.g., "assistance data") to UE 105 to facilitate the location determination. According to some embodiments, location server 160 may include a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, location server 160 may include a Discovered SLP (D-SLP) or an Emergency SLP (E-SLP). Location server 160 may alternatively include an Enhanced Serving Mobile Location Center (E-SMLC) that supports location of UE 105 using a control plane (CP) location solution for LTE radio access by UE 105. Location server 160 may further include a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In the UP location solution, signaling to control and manage the location of UE 105 may be exchanged between location server 160 and UE 105 as data (e.g., data transported using the Internet Protocol (IP) and/or Transmission Control Protocol (TCP)) from the perspective of network 170.

As described above (and discussed in more detail below), the estimated location of UE 105 may be based on measurements of RF signals sent from and/or received by the UE 105. In particular, these measurements can provide information regarding the relative distance and/or angle of UE 105 from one or more components in positioning system 100 (e.g., GNSS satellites 110, APs 130, and base stations 120). The location of UE 105 can be estimated geometrically (e.g., using multi-angulation and/or multi-lateration techniques) based on the distance and/or angle measurements, along with the known position of the one or more components.

Although terrestrial components such as APs 130 and base stations 120 may be fixed, embodiments are not so limited. In some embodiments, mobile components may be used. Moreover, in some embodiments, the location of UE 105 may be estimated at least in part based on measurements of RF signals communicated between UE 105 and one or more other UEs (not shown in FIG. 1), which may be mobile or stationary. Direct communication between UEs in this manner may comprise sidelink and/or similar Device-to-Device (D2D) communication technologies. Sidelink, which is defined by 3GPP, is a form of D2D communication under the cellular-based LTE and NR standards.

External client 180 may be a web server or remote application that may have some association with UE 105 (e.g., may be accessed by a user of UE 105), or may be a server, application, or computer system providing a location service to some other users, which may include obtaining and providing the location of UE 105 (e.g., to enable a service such as friend or relative finder, asset tracking or child or pet location). Additionally or alternatively, external client 180 may obtain and provide the location of UE 105 to an emergency service provider, government agency, and the like.

A Global Navigation Satellite System may include, for example, a constellation of SVs in synchronized orbits to transmit navigation signals to locations on a vast portion of the Earth's surface simultaneously from multiple SVs in the constellation. A SV which is a member of a particular GNSS constellation typically transmits navigation signals in a format that is unique to the particular GNSS constellation. A GNSS receiver (e.g., in UE 105) may be used to determine both the absolute location and the relative location of UE 105. The GNSS receiver may include, for example, a receiver that can receive broadcast signals from GNSS satellites 110, such as satellites for the Global Position System (GPS, United States), Galileo (European Union), Glonass (Russia), Beidou (China), or the like. The GNSS receiver may determine the absolute position and velocity of UE 105 by processing the signals broadcasted by satellites. GNSS satellites 110 may orbit at altitudes, for example, from about 20,000 km to about 23,000 km, and may have very accurate known time and ephemerides. GNSS satellites 110 may broadcast GNSS signals that include pseudorandom patterns. The GNSS signals may include carrier frequencies in the L-band, such as 1575.42 MHz (L1), 1227.6 MHz (L2), or 1176.45 MHz (L5) modulated at about 1 MHz and/or about 10 MHz. The GNSS receiver may receive GNSS signals broadcasted by three or more GNSS satellites 110. Because the satellites are always in motion, the GNSS receiver may continuously acquire and track the signals from the satellites in view, and compute its distance to a set of satellites based on the speed of the electromagnetic wave (e.g., speed of light) and the propagation time (e.g., time-of-flight) of the incoming signals travelling through space that may be determined using the satellite and receiver local clocks.

Figure 2:
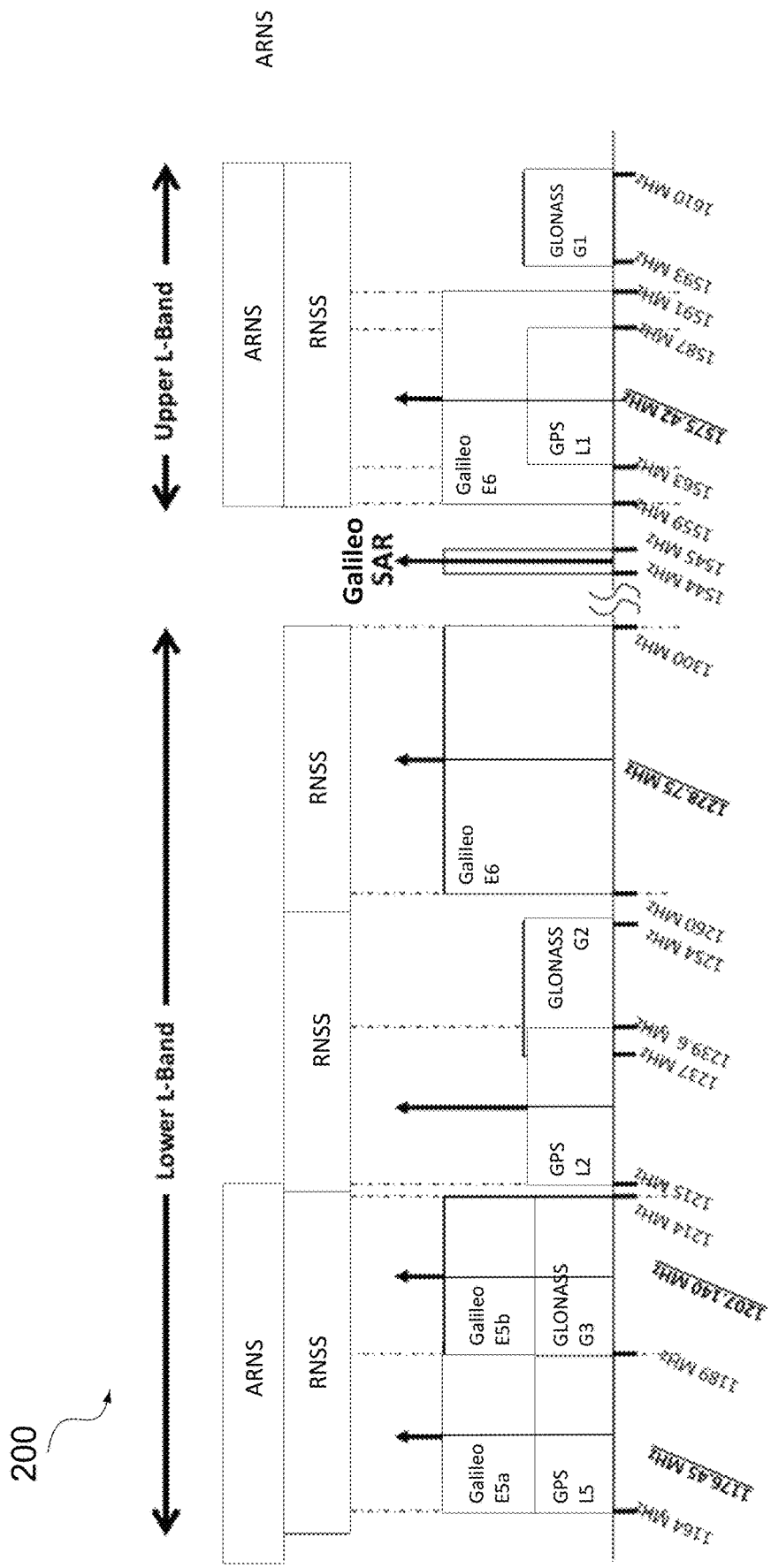
FIG. 2 illustrates frequency bands of examples of Global Navigation Satellite Systems.

FIG. 2 illustrates frequency bands of examples of Global Navigation Satellite Systems. FIG. 2 shows the frequency bands for the Radio Navigation Satellite System (RNSS). There are two bands in the spectrum allocated primarily to the Aeronautical Radio Navigation Service (ARNS). These bands may be suitable for Safety-of-Life applications because no other users are allowed to interfere in these bands. These bands include the upper L-band and the bottom of the lower L-band. The upper L-band includes the GPS L1, Galileo E1, and GLONASS G1 signals. The bottom of the lower L-band includes GPS L5 and Galileo E5 signals, with E5a and L5 signals coexisting in the same frequencies. The remaining GPS L2, GLONASS G2, and Galileo E6 signals are in the bands between about 1,215.6 and about 1,350 MHz. These bands are primarily allocated to Radio-location Services (ground radars) and RNSS, and thus GNSS signals in these bands may be more vulnerable to interference.

TABLE 1

Frequency bands of examples of Global Navigation Satellite Systems

| GNSS | Lower L-band | Upper L-band |
| --- | --- | --- |
| GPS | L5: 1164-1189 MHz<br>L2: 1215-1239.6 MHz | L1: 1567-1587 MHz |
| Galileo | E5: 1164-1215 MHz<br>E6: 1260-1300 MHz | E1: 1559-1591 MHz |

TABLE 1-continued

Frequency bands of examples of Global Navigation Satellite Systems

| GNSS | Lower L-band | Upper L-band |
|---|---|---|
| GLONASS | G3: 1189-1214 MHz<br>G2: 1237-1254 MHz | G1: 1593-1610 MHz |
| BeiDou | B2I: 1179-1203 MHz<br>B3: 1256-1280 MHz | B1I: 1553-1569 MHz |

In GPS system, GPS L1 signals may include a navigation message, a coarse acquisition (C/A) code that is not encrypted and is freely available to the public, and an encrypted precision (P) code or P(Y) code (restricted access) that is used exclusively by authorized U.S. military receivers. The navigation message may be a low bit-rate (e.g., about 50 bps) message that includes, for example, GPS date and time, satellite status and health, satellite ephemeris data (which allows the receiver to calculate the satellite's position), and almanac that includes information and status (e.g., coarse orbit and status information) for all GPS satellites such that GPS receivers know which satellites are available for tracking. GNSS signals may pass through the near-vacuum space and various layers of atmosphere to the earth and received by the GNSS receiver. In some embodiments, satellite assistance information may be downloaded from a server for determining, in conjunction with received signals, the GNSS receiver's location relative to the satellites and, based on the known location of each satellite, the GNSS receiver's (and thus UE 105's) location on earth.

A GNSS receiver may generally track three or more (e.g., four or more) satellites that are in lines of sight of the antenna of the GNSS receiver and have a small dilution of precision (DOP) to receive GNSS signals from the satellites. For each satellite tracked, the GNSS receiver may determine the propagation time of a pseudorandom noise (PRN) code that includes, for example, 1023 or more bits. GNSS receivers using code-based techniques may correlate or align with the PRN codes broadcast by satellites to determine its time and position. The GNSS receiver may know the PRN code for each satellite, and thus can determine the time it receives the code from a particular satellite to determine the time of propagation. The time of propagation may be multiplied with the speed of light in free space to determine the distance between the GNSS receiver and the particular satellite, which may be referred to as a "pseudorange" because the calculated distance may include errors (e.g., clock errors of the GNSS receiver and other errors) and thus may not be exactly equal to the actual range. Using a positioning technique, such as the trilateration technique, the satellite ephemeris data, and the calculated distance between the GNSS receiver and each of three of more satellites, a GNSS receiver may determine the location of the GNSS receiver as the intersection point of three or more spheres. Because the relatively large clock errors of the GNSS receiver, the three or more spheres may not intersect at a single point. The GNSS receiver may adjust the delay of its own clock to determine the time of flight and the pseudoranges, until the three or more spheres approximately intersect at a single point, which indicates the measured location of the GNSS receiver.

There may be many errors associated with a GNSS-based position system. For example, the atomic clocks in the GNSS satellites are very accurate, but they may still drift a small amount, and thus may cause an error of, for example, about ±2 meters. Like the satellite clock, the satellite orbit may also vary a small amount, and thus may cause an error of, for example, about ±2.5 meters. To achieve a better accuracy, the GNSS receiver may need to compensate for the clock error and the orbit error of a satellite. For example, some GNSS receivers may use carrier-based techniques, such as Real Time Kinematic (RTK) and Precise Point Positioning (PPP) techniques, that measure the phase of the carrier wave. Because the carrier wave for the GNSS signal is a sine wave with a period of less than one meter (e.g., about 19 cm for L1 carrier signal), a much more precise measurement of the time of flight may be achieved using the carrier-based techniques. In some positioning systems, the GNSS receiver may download correction data from, for example, a Satellite Based Augmentation System (SBAS) or PPP service satellite, or a differential GNSS or RTK base station, to further improve the accuracy of the positioning.

For example, in SBAS systems, reference stations that are geographically distributed throughout the SBAS service area may receive GNSS signals and forward them to a master station. Since the locations of the reference stations are accurately known, the master station can accurately calculate wide-area correction data. The calculated correction data can be uploaded to an SBAS satellite, which may broadcast the correction data to GNSS receivers in the SBAS coverage area. The PPP technique may also use correction data broadcasted from satellites. In addition, the PPP technique may use carrier-based ranging to achieve a better accuracy.

In a differential GNSS system, the position of a fixed GNSS receiver (referred to as a base station) may be determined to a high degree of accuracy, and the base station may compare the known high accuracy position to the position calculated using GNSS signals. Differences between the two positions can be attributed to satellite ephemeris and clock errors, and errors associated with atmospheric delay. The base station may send these calculated errors to other GNSS receivers (e.g., rovers or vehicle-borne GNSS receivers), which may then use the calculated errors to make corrections to the position calculations. The RTK technique may also remove errors common to a base station and a rover. In addition, the RTK technique may use carrier-based ranging to achieve a better accuracy.

GNSS signals may only propagate in a straight line in a vacuum or through a perfectly homogeneous medium, and may bend as they pass through the earth's atmosphere. The layer of the earth's atmosphere that influences the transmission of GPS (and other GNSS) signals the most is the ionosphere layer, a layer about 70 to about 1,000 km above the earth's surface and including ionized gas molecules and free electrons generated by, for example, ultraviolet rays from the sun. The ionosphere layer may delay the satellite signals and can cause a significant amount of satellite position error, such as ±5 meters. The ionospheric delay may vary with solar activity, time of year, season, time of day, location, and the like, and thus may be difficult to predict. The ionospheric delay may also be frequency dependent, and thus may be determined and eliminated by calculating the range using both L1 and L5 (or L2) signals. The ionospheric condition may be similar within a local area such that a base station and rover receivers may experience similar ionospheric delay. As such, the ionospheric delay may be compensated for using, for example, differential GNSS or RTK systems.

Another layer of the earth's atmosphere that may influence the transmission of GNSS signals is the troposphere layer, the lowest layer of the Earth's atmosphere. The delay caused by the troposphere layer may be a function of local temperature, pressure, relative humidity, and the like. L1 and L2 signals may be equally delayed by the troposphere, and thus the effect of tropospheric delay may not be eliminated using GNSS signals in multiple frequency bands. The troposphere may be modeled to predict and compensate for much of the tropospheric delay. Since the tropospheric conditions are generally similar within a local area, a base station and nearby rover receivers may experience similar tropospheric delay, which may be compensated for in differential GNSS or RTK systems.

Portions of the GNSS signals transmitted by satellites may be reflected on the way to the GNSS receiver, such as by a building. This phenomenon is referred to as multipath propagation. The reflected signals may travel longer distances and thus are delayed from the direct signals, and may interfere with the direct signals if the reflected signals are sufficiently strong. The delayed signals can cause the receiver to calculate an incorrect position. Multipath errors may be difficult to handle because they are generally local errors that may not be similarly experienced by base stations. Techniques have been developed where the receiver may only consider the earliest-arriving (or the strongest) signals and ignore the multipath signals that arrive later. In some cases, expensive high-end GNSS receivers and antennas may be needed to reduce long-delay multipath errors and short-delay multipath errors.

As described above, GNSS satellites transmit signals in multiple frequency bands. An GNSS receiver may tune to one or more bands at the same time to improve the accuracy of the position retrieved, such as by cancelling out the non-constant ionosphere delay that depends on the signal's frequency. The electromagnetic waves transmitted by the satellites reach the antenna of a GNSS receiver after traveling more than about 20,000 km. Signals transmitted by GNSS SVs generally have very low signal strength (e.g., less than about −120 dBm) by the time they arrive at the GNSS receiver. The electromagnetic waves are converted into an electrical signal and de-modulated to determine raw data, such as the pseudorange, phase, carrier-to-noise ratio (C/N0), and Doppler shift. Pseudoranges are the apparent distances between each satellite and the receiver. The phase is a precise (but ambiguous) measurement of the electromagnetic wave. C/N0 relates to the received power. Doppler shift is a measurement of the relative motion between a receiver and a satellite. These information may be provided to a navigation engine, which may solve a set of equations to retrieve information about the latitude, longitude, height, and time of the GNSS receiver.

Figure 3:
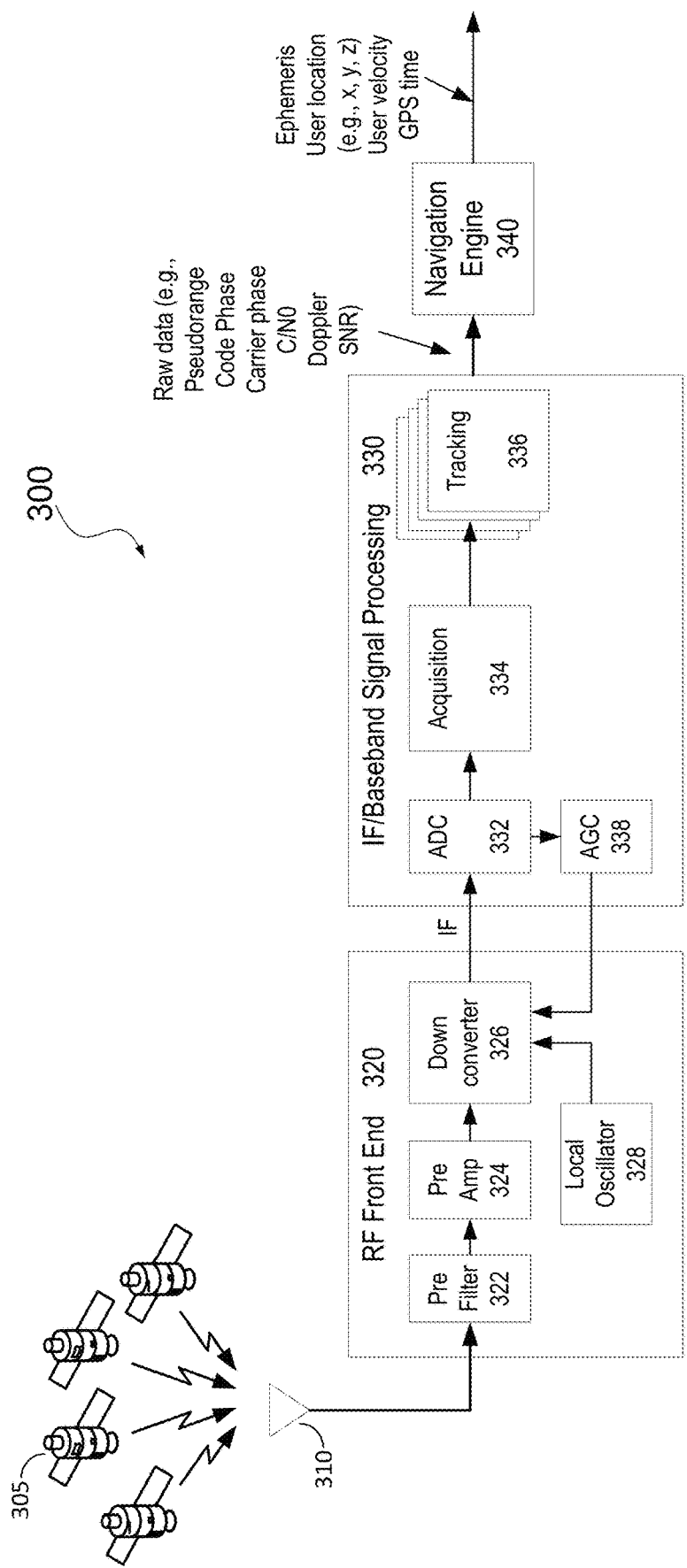
FIG. 3 is a simplified block diagram of an example of a Global Navigation Satellite System (GNSS) receiver.

FIG. 3 is a simplified block diagram of an example of a GNSS receiver 300. GNSS receiver 300 is a spread spectrum receiver for acquisition, tracking, and extracting useful information from the incoming satellite signals. GNSS receiver 300 may include an antenna 310, a radio frequency (RF) front end 320, an intermediate frequency (IF)/baseband (BB) signal processing section 330, and a navigation engine 340. RF front end 320 and IF/BB signal processing section 330 may each include various hardware modules, whereas navigation engine 340 may be implemented using software.

Antenna 310 may be configured to receive right-hand circularly polarized (RHCP) signals transmitted by GNSS satellites. Antenna 310 may need to be able to receive GNSS signals in different frequency bands, polarizations, and elevation angles. An antenna gain pattern of antenna 310 may indicate how well antenna 310 performs at various center frequencies, polarizations, and elevation angles. More details of antenna 310 are described below.

In the illustrated example, RF front end 320 may include an optional pre-filter 322, a preamplifier 324, a downconverter 326, and a local oscillator 328. Pre-filter 322 may filter the received signal from antenna 310 to remove signals outside of the L bands, reduce the impact of aliasing, and limit the noise bandwidth. Wide bandwidth signals can provide high-resolution measurements in the time domain but may need higher sampling rates, causing the receiver to consume much more power. A filter can mitigate this by allowing narrower band signals to pass through. In some embodiments, pre-filter 322 may be a part of preamplifier 324.

Because antenna 310 may receive signals in multiple frequency bands, there may be one preamplifier for each band or a single broadband preamplifier for multiple bands. Preamplifier 324 may generally include a pre-selector filter (e.g., pre-filter 322) that removes out-of-band interference and limits the noise bandwidth. Preamplifier 324 may also include a low-noise amplifier (LNA) and a burnout protection circuit that prevents possible high-power interference. GPS satellites have an orbit altitude of about 20,000 km (90 degrees elevation) from earth. The transmit power of each satellite may be about 45 Watt at about 1575 MHz, and the antenna gain may be about 12 dB. If antenna 310 has an antenna gain of 4 dB, the received signal power is less than about −120 dBm (about −125 dBm with additional losses, such as atmospheric and antenna losses), while the noise power in the system bandwidth (e.g., about 2.0 MHz) may be about −110 dBm. Due to the direct spread-spectrum modulation scheme, there may be a processing gain of 43 dB, and thus theoretically a GNSS signal may be recovered as long as it is greater than −153 dBm. However, in order to improve the quality of services, the received power strength may need to be higher than the theoretical level. For instance, during acquisition, the received signal power may need to be −135 dBm or higher. During tracking, the received signal power may need to be −147 dBm or higher. An LNA generally needs to amplify the signals by about 20 to about 35 dB to increase them to levels suitable for processing.

Downconverter 326 may convert the RF frequency signals to either intermediate frequency signals or directly to baseband signals to facilitate the sampling and filtering processes. The down conversion is generally done using a mixer. The mixer may multiply the received signal with a carrier signal locally generated by local oscillator 328, and then filter the output signals to remove high order signals and keep the differential (e.g., heterodyne) signal. The filtering and down-conversion may be achieved in multiple, consecutive stages. GNSS receivers make their measurements by estimating the time of arrival, carrier phase, and frequency of the received signal. In some embodiments, a single local reference oscillator may be used to synthesize all reference signals used in the receiver, for example, using a combination of integer and fractional frequency multiplications. In some cases, a GNSS receiver may have multiple frequency references for down-conversion.

IF/BB signal processing section 330 may include, for example, an analog-to-digital converter 332, an acquisition module 334, and one or more tracking units 336. ADC 332 may digitize IF or baseband analog signals to digital signals in the baseband. In some embodiments, an automatic gain control (AGC) stage 338 may be used to adjust the gain of RF front end 320.

As described above, a GNSS receiver may, during a signal acquisition process, identify satellites that are visible to the receiver, and provide the measurement of the Doppler shift in carrier frequency and the delay in the C/A code of the incoming GNSS signal. The Doppler shift in the carrier frequency of the GNSS signal may be caused by the relative velocity of the satellite with respect to the receiver. Satellites in the GNSS system move in rapid orbits around the earth, where the orbits may be different for different constellations (e.g., low earth orbit, medium earth orbit, coverage, etc.). Thus, while a satellite may transmit at a starting frequency $f_0$, there is a Doppler shift associated with the satellite signal received at the GNSS receiver. This shift is largely due to the motion of the satellite ($\Delta f_{sat}$) and may also be caused by the movement of the receiver ($\Delta f_{receiver}$). Thus, the GNSS receiver may detect the satellite signal at $f_0 + \Delta f_{sat} + \Delta f_{receiver}$. The C/A code delay is due to the transit time of the satellite signal from the satellite to the GNSS receiver. Within a given satellite band, for example, L1 for GPS, each satellite generally transmits at the same frequency but uses orthogonal coding such that different satellite signals may be detected and respective pseudoranges may be determined at the baseband. In contrast, GLONASS satellites share the same coding but use different sub-bands for the satellite signals.

As also described above, each satellite in GPS system may transmit a PRN code that includes, for example, 1023 or more bits. The PRN code may be unique to each satellite. For each satellite tracked, the GNSS receiver may determine the propagation time of the PRN code. The GNSS receiver may know the PRN code for each satellite at a given time, and may generate an electronic replica with the GNSS receiver's own clock. The GNSS receiver may then compare the replica signal with the received GNSS signal. Since the GNSS signal was actually created in the satellite some time earlier (e.g., about 0.07 seconds earlier) due to the finite speed of the electromagnetic wave, the receiver's replica signal needs be delayed in order to match or align the incoming signal with the replica signal. This time delay includes the time for the signal to propagate from the satellite to the receiver, and errors in the satellite clock and the receiver clock.

In some embodiments, the time delay can be determined by autocorrelation. In the autocorrelation, the first bit from the incoming signal is multiplied by the first bit of the replica signal. For example, if the first bits from the two signals both have values −1, then the result is (−1)×(−1)=+1. Similarly, if both bits have values +1, then the result is +1. On the other hand, if the two bits disagree, the result is (+1)×(−1)=−1. This process is repeated for the second pair of bits, and so on. The result can be written as a sequence of +1 (where the bits agree) and −1 (where the bits disagree). This sequence is then summed and divided by the total number of bits in each signal. For example, if signal A includes (+1, −1, −1, +1, −1), and signal B includes (+1, +1, −1, −1, +1), then the multiplication gives (+1, −1, +1, −1, −1), the sum of which gives −1, and dividing the sum by the number of bits (5) gives −0.2. If the two signals match perfectly, the result would be +1. When the two signals include pseudorandom patterns and are not properly matched in time, the result of the autocorrelation may be close to zero. If the two signals are aligned in time, the result is close to +1 (but not exactly, since a real signal also has noise, and thus some bits are incorrect). In general, the larger the number of bits that are compared, the better the resolution. The autocorrelation function may have a shape of an equilateral triangle with a value of 1 at its peak (if no noise), which may be used to find the time displacement that maximizes the autocorrelation.

To lock onto a GNSS satellite signal, a GNSS receiver may perform a two dimensional search for the signal using, for example, the autocorrelation technique described above. The first dimension is the signal frequency. The receiver needs to determine the carrier frequency including the Doppler shift. Once the carrier frequency and Doppler shift is evaluated, it is tracked with, for example, a Phase Lock Loop (PLL). The second dimension is time. As described above, the GPS signal for each satellite includes a 1023-bit long PRN code sent at a rate of 1.023 Mbits per second, such that the code repeats every millisecond. To acquire in the time dimension, the receiver may set an internal clock to align with a correct one of the 1023 possible time slots by searching in the possible values. Once the correct delay is found, it is tracked with, for example, a Delay Lock Loop (DLL).

The acquisition may be performed on a block of data received from the satellite signal, such as during the period of C/A code (e.g., 1 ms). Acquisition module 334 may synchronize the locally generated carrier and C/A code with the received signals as described above. Acquisition module 334 may estimate the Doppler frequency and code-delay of the signal from each satellite. In one example, a GNSS signal from the RF front end is multiplied with a locally generated reference signal. The resultant carrier-free signal (e.g., baseband signal) is multiplied with a locally generated PRN code with a certain delay. The result is then integrated as described above for a certain period of time depending on the type of signal and the signal-to-noise ratio. The integrated result may be compared with a threshold to determine whether the signal has been found or not. If the integrated result is greater than the threshold, the frequency of the locally generated reference signal and/or the code delay may be handed over to tracking units 336 for further processing. If the integrated result is smaller than the threshold, the frequency of the locally generated reference signal and/or the delay of the locally generated PRN code may be adjusted to continue to search for (acquire) the proper satellite, until they match the frequency and code delay of the received signal, thereby producing an integrated result greater than the threshold.

After identifying the available satellites and acquiring the parameters, such as the frequency and code delay of received signal from each of three or more satellites, parallel channels (e.g., tracking units 336) may be used to track the frequencies and delays of the identified satellites using, for example, PLLs and DLLs described above.

The output from IF/BB signal processing section 330 may be raw data, such as the pseudorange to each satellite, code delay and the Doppler frequency of the incoming signal from each satellite, phase delay, and carrier-to-noise ratio (C/N0) or signal-to-noise ratio (SNR). Navigation engine 340 may use the raw data generated by IF/BB signal processing section 330 for three or more satellites to determine the user's position (e.g., x, y, and z coordinates), velocity, and time information, or the loss of lock of signal.

As described above, the GNSS receiver may need to use one or more antennas for receiving GNSS signals in different L-bands. A portable device including the GNSS receiver may also include antennas for other purposes, such as cellular communication service, high-speed data service, and the like. Antennas are important components for any connected device, such as a mobile phone or an Internet-of-Thing (IoT) device. Designing the right antennas that can both achieve the desired performance and have small footprints to fit in a compact portable device, such as a smartphone, a smart watch, or an IOT device, remains a challenging task.

Figure 4A:
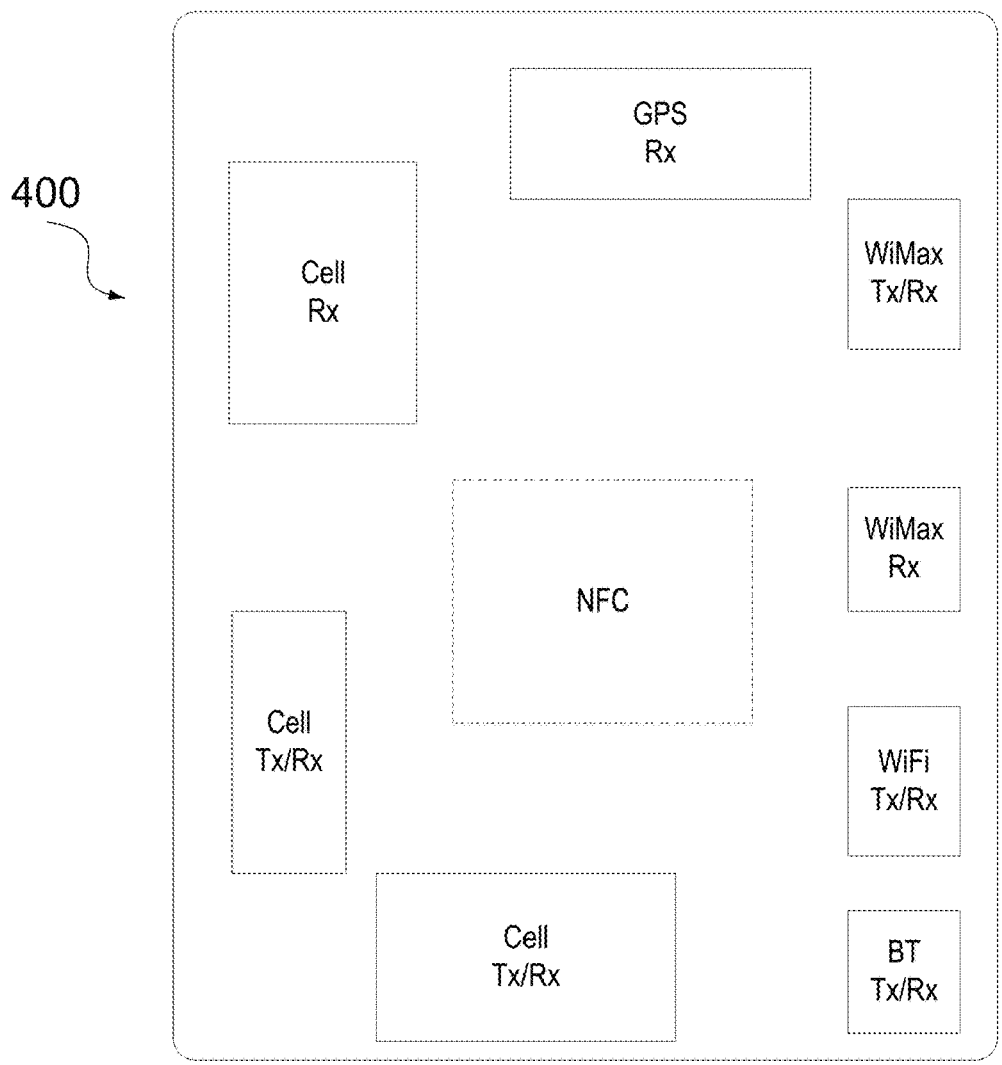
FIG. 4A illustrates examples of radio frequency antennas in an example of a smartphone.

FIG. 4A illustrates examples of radio frequency antennas in an example of a smartphone 400. A smart phone can have multiple antennas, such as from four to 13 or more different antennas. The antennas may include different types of antennas, such as cellular, Wi-Fi, Bluetooth, and GPS antennas. Some smart phones may also include ZigBee (IEEE 802.15.4, at 930 MHz and lower), FM radio, and magnetic Near-Field Communication (NFC) antennas. Each type of antennas may include one or more antennas. For example, there may be two to four antennas for cellular communication, and one or more antennas for Wi-Fi and WiMAX. The multiplicity of antennas may enable the smartphones to avoid dropouts, for example, when a user's hand obscures one antenna during a conversation. Having multiple antennas for the same communications link may also allow smartphone carriers to combine multiple streams to improve the data transfer rate. In some embodiments, an antenna may be used for both transmitting and receiving signals. In some embodiments, an antenna may be dedicated for receiving signals (referred to as a diversity antenna), such as receiving GNSS signals or receiving high-speed data signals. Some antennas may be dual-band or multi-band antennas.

In the illustrated example, smartphone 400 may include two WiMAX antennas (e.g., operating at 2.6 GHz), one for both Tx/Rx and another one as a diversity (Rx only) antenna. WiFi antennas may operate in frequency bands different from the frequency bands cellular antennas. For example, WiFi antennas may operate at 2.4 GHz or 5.8 GHz, while cellular antennas may operate at 800 MHz, 900 MHz, 1800 MHz, 1900 MHz, 2100 MHz, 2.3 GHz, 2.5 GHz, sub-6 GHz, about 5.9 to 7.2 GHz, millimeter-wave frequency (e.g., around 28 or 37 GHz), and the like. Antennas may pick up electromagnetic wave signals well only at the frequencies at which they naturally resonate. Generally, the resonant frequency of an antenna depends on its physical size, although the frequency can also be modified without changing the size by adding certain electronic components to tune the antenna.

There may be some physical limitations related to how close to each other and in what shapes these antennas may be. Most antennas may be arranged around the edges of smartphone 400 and may be installed on a PCB that may also include many other components (not shown in FIG. 4A) installed thereon, such as processors, memory, transceivers, modems, audio codecs, image processing circuits, a display driver, power management circuits, and the like. Thus, the form factors of the antennas may need to be small in order to fit in the device, without impacting the performance of other components and the device. For example, a GNSS antenna may need to be less than 10 $cm^2$ to fit in a smartphone. Some popular printed antennas for smartphones and portable devices include patch antennas, inverted-F antennas (IFAs), or Planar Inverted-F antennas (PIFAs), where the large ground planes in the PCB may be used as the ground plane for all the antennas. If the size of the ground plane is reduced (e.g., cut in certain regions), the smartphone may not radiate well at certain frequency bands, such as lower frequencies which have longer wavelengths.

Figure 4B:
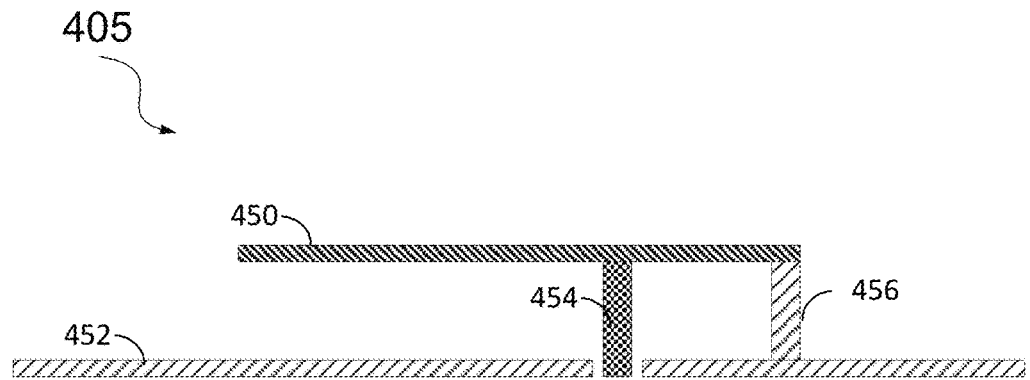
FIG. 4B illustrates an example of a radio frequency antenna including a planar inverted F antenna (PIFA).

FIG. 4B illustrates an example of a radio frequency antenna including a PIFA 405. PIFA 405 may look like a letter "F" in a side view. PIFA 405 includes two shorter sections providing a feed (e.g., section 454) and a short to ground (e.g., section 456), a tail 450 (or top patch) as the radiating surface, and a ground plane 452. PIFA 405 may resonant at a quarter-wavelength (thus reducing the physical dimension of PIFA 405) due to the shorting pin (e.g., section 456) at the end. The feed pin (e.g., section 454) is placed between the open and shorted end, and the position of the feed pin may control the input impedance. PIFA 405 may generally have good Specific Absorption Rate (SAR) properties, a low profile, and an omnidirectional pattern, and can be made to radiate in more than one frequency band. As such, PIFAs are increasingly used in smartphones, even though PIFAs are generally linearly polarized and their efficiencies may be moderate.

As described above, GNSS signals are typically generated in circular polarization. A circularly polarized electromagnetic wave may include two orthogonal linearly polarized components that are out of phase by about 90°. The two orthogonal linearly polarized components of the circular polarization GNSS signal may undergo a same level of Faraday rotation at high elevations when passing through the ionosphere. Therefore, the polarization purity of the signal may not be reduced. For linearly polarized signals, Faraday rotation may cause the signal to rotate to a different polarization angle than the original one, which may need to be compensated at the receiving antenna on earth either by rotating the antenna or utilizing both orthogonal components of the received signal for polarization compensation. In addition, circular polarizations may be more tolerant of physical orientation mismatches. For example, if an antenna transmits signals with vertical polarization, a vertically oriented linear antenna may receive a strong signal, but the received signal strength may reduce by more than 20 dB if the antenna is rotated by 90°. However, if an antenna transmits a circular polarization signal, a linear antenna may receive the signal with a lower loss (e.g., about 3 dB) whether the linear antenna is vertically or horizontally orientated.

Figure 5A:
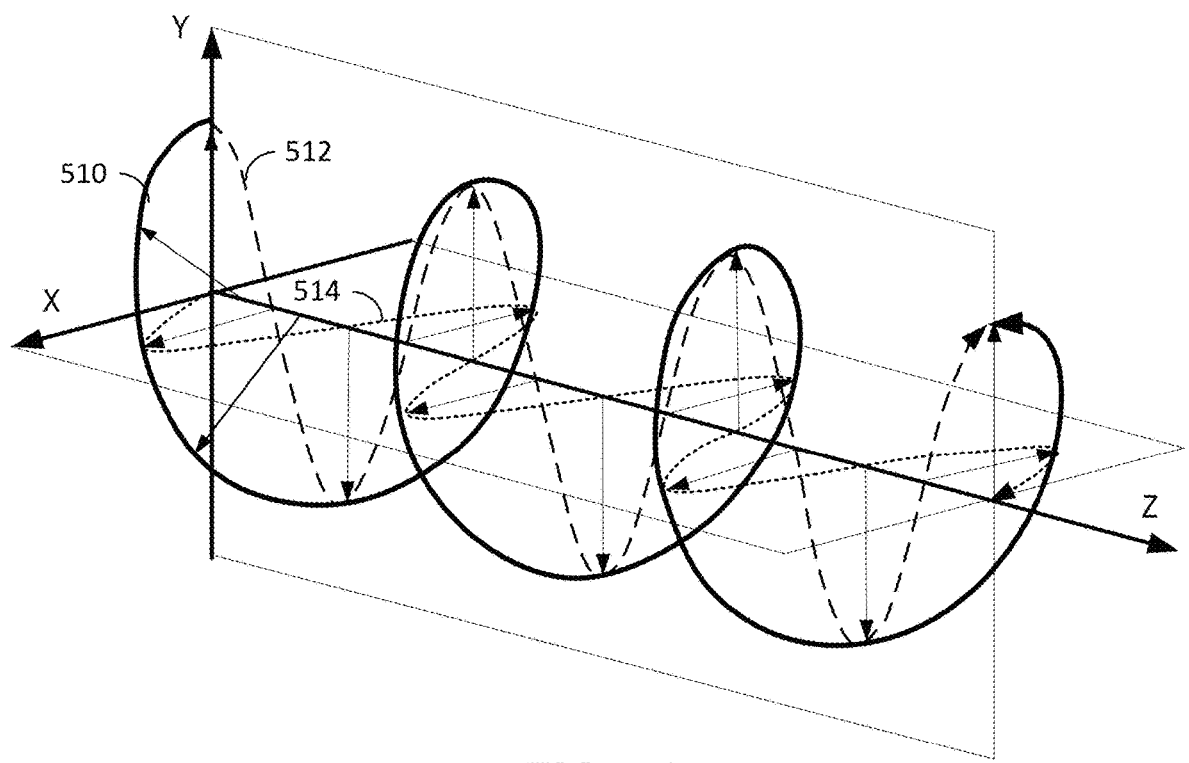
FIG. 5A illustrates the rotation of the electric field vector of an example of a circularly polarized electrical signal.

FIG. 5A illustrates the rotation of the electrical field vector of an example of a circularly polarized electrical signal 510. Circularly polarized electrical signal 510 may include a first component 512 with the electrical field oscillating in a vertical plane (e.g., the Y-Z plane) and a second component 514 with the electric field oscillating in a horizontal plane (e.g., the X-Z plane). Thus, first component 512 and second component 514 are both linearly polarized and are synchronized but orthogonal to each other. Depending on the phase and/or amplitude difference between first component 512 and second component 514, the combined electrical wave may be linearly polarized, circularly polarized, or elliptically polarized. For example, when the phases of first component 512 and second component 514 are the same, the combined electrical wave may be a linearly polarized wave, where the electric field vector points in the same direction.

In circular polarization signals, the electric field vector does not point in the same direction. Instead, the electric field vector rotates 360° per wavelength during the wave propagation. The rotation is achieved by the specific excitation of the orthogonal components. If the phase delay between the two orthogonal components is about 90°, circular polarization may be achieved. When the phase delay between the two orthogonal components is not 90°, the combined signal may not be circularly polarized and may become elliptically polarized. Depending on whether the horizontal component or the vertical component is earlier, the direction of the circular rotation may be different, which may determine whether the polarization is right-handed or left-handed circular polarization. The purity of a circular polarization is described in terms of axial ratio, which is defined as the ratio of two orthogonal components of electric field on polarization ellipse traced by the electric field vector in time domain. Axial ratio changes with elevation and azimuth, but it is usually stated at zenith as a single value.

Figure 5B:
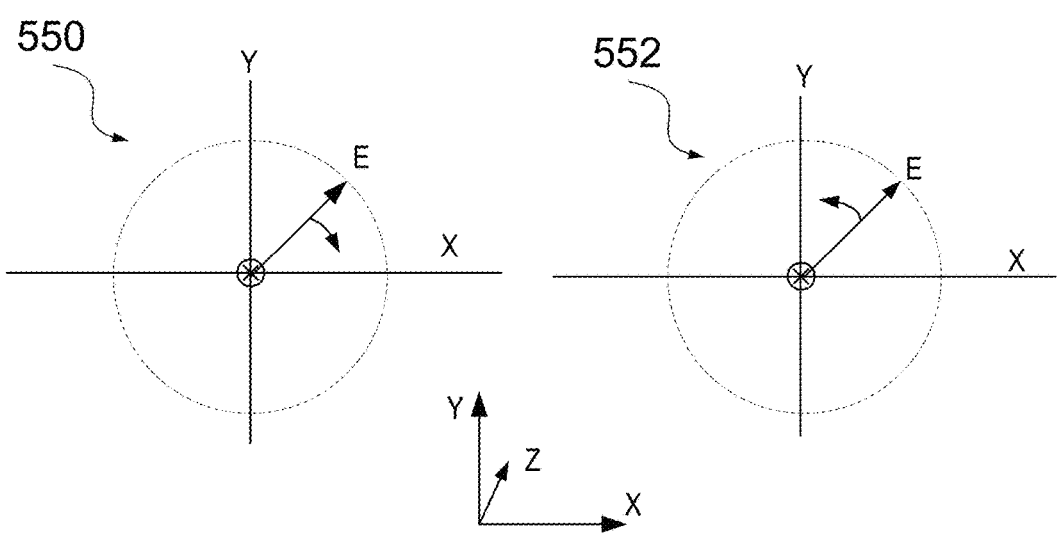
FIG. 5B illustrates examples of signals characterized by left-handed circular polarization or right-handed circular polarization.

FIG. 5B illustrates examples of signals having left-handed circular polarization or right-handed circular polarization. A chart 550 shows a right-handed circularly polarized signal, where the propagation direction of the signal is in the +z direction and the electric field vector rotates clockwise when viewed in the propagation direction. Circularly polarized electrical signal 510 shown in FIG. 5A is an example of a RHCP signal. A chart 552 shows a left-handed circularly polarized signal, where the propagation direction of the signal is in the +z direction and the electric field vector rotates counter-clockwise when viewed in the propagation direction.

As described above, RHCP GNSS signals were conventionally chosen for signal transmission. Therefore, up-looking antennas are generally RHCP antennas in order to capture the direct (line-of-sight) signal. When the GNSS signal is specularly reflected with a low angle of incidence, the polarization of the signal is inverted after the reflection, thus becoming LHCP. Therefore, for GNSS-R measurements, the down-looking antennas are generally LHCP antennas. For partially reflecting surfaces or with high angles of incidence, the relative contribution of the two linear polarization components in the reflected signal may vary. Good GNSS antennas may have an axial ratio less than 1 dB at zenith.

Linear polarized antennas are dominant in smartphones because they are relatively easy to fit in the smartphones and can accept both RHCP, LHCP, or linear polarized signals. However, because the transmitted GNSS signals are generally circularly polarized, there may be as much as a 3 dB loss in the signal level received by the linearly polarized antennas. In addition, in multipath environments, with each reflection, the polarization changes from RHCP to LHCP and vice versa. Because a linear polarization antenna can receive both RHCP, LHCP, or linear polarized signals, the linear polarization antenna may not be able to distinguish the line-of-sight signal and the reflected signal that may contribute to positioning errors.

Designing a circular polarized antenna for use in smartphones can be difficult due to the physical dimension and PCB area limitations, PCB shape constraints (e.g., driven by industrial design, battery size, etc.), and the limited degree of freedom in antenna placement. The wavelengths of the GPS carriers are about 19 cm (for L1), about 24 cm (for L2), and about 25 cm (for L5). Antennas that are a quarter or half wavelength are generally the most practical and efficient. Therefore, GPS antenna elements can be as small as 4 or 5 cm or smaller. For example, in some embodiments, materials with higher dielectric constants (e.g., ceramic instead of FR-4) may be used as the PCB material for the antenna such that the wavelengths of the GPS carriers and thus the antenna sizes may be reduced.

As described above, most smartphones have a PCB that is a multi-layer stack with multiple layers of metal planes (e.g., copper). Integrated circuits (ICs) placed on the PCB and interconnection traces routed on the PCB may use certain copper cutouts. The ground plane may need to be excited in a particular way to achieve the circular polarization. Thus, it can be very difficult to modify the ground plane in a desired way and excite the currents on it to achieve circular polarization with an axial ratio close to 0 dB, without affecting the performance of other circuits. For example, even though RHCP antennas may be implemented using a patch antenna, the area used for the patch antenna and the ground clearance on the PCB for the patch antenna may not be practical in smartphone designs. Additionally, the shape of the PCB and its associated ground plane may be dictated by the industrial design of the smartphone and the battery size, and hence may not be optimized to achieve circular polarization. Furthermore, because the ground plane needs to be excited in a particular way to achieve the circular polarization, antennas may need to be placed in a particular location. However, because smartphones support multiple technologies other than GNSS, such as GSM/WCDMA, LTE, 5G NR, WiFi, WiMAX, Bluetooth, NFC, Zigbee, or the like, which also need antennas for transmit and receive diversity, the GNSS antenna may not be placed in any desired location.

As described above, a circularly polarized signal may include two orthogonal linearly polarized components, circular polarized antenna can be built by combining the outputs from a horizontal polarization antenna and a vertical polarization antenna with a 90° phase shift added between the two outputs. The relative phase of the two outputs may determine whether the combined antennas function as an RHCP antenna, an LHCP antenna, or an elliptically polarized antenna. For example, circularly polarized electrical signal 510 shown in FIG. 5A may have an RHCP, where the phase of the vertical component (e.g., first component 512) may be 90° earlier than the phase of the horizontal component (e.g., second component 514), such that the resultant electric field vector may rotate clockwise when viewed in the propagation direction (e.g., Z-direction). When the phase delay between the horizontal component and the vertical component is not 90° and/or the amplitude of the horizontal component is not equal to the amplitude of the vertical component, the combined RF signal may be elliptically polarized.

According to certain embodiments, a GNSS antenna in a smartphone or another portable device (e.g., a smart watch) may include two or more linear polarization antennas (e.g., PIFAs), and a 90° hybrid coupler coupled to the two or more linear polarization antennas. The 90° hybrid coupler may combine the linear polarization signals received by two linear polarization antennas, which may have already been used in the smartphone for other purposes (e.g., WWAN, WLAN, or WPAN, such as Bluetooth or ZigBee), to replicate an RHCP GNSS antenna with improved signal power (e.g., by about 3 dB) and multipath rejection. The higher signal power combined with the reduced number of multipath signals may result in an improved positioning accuracy. In some embodiments, the GNSS, WWAN, WLAN, and/or WPAN antennas may be tuned or switched to optimize the antenna usage.

Figure 6A:
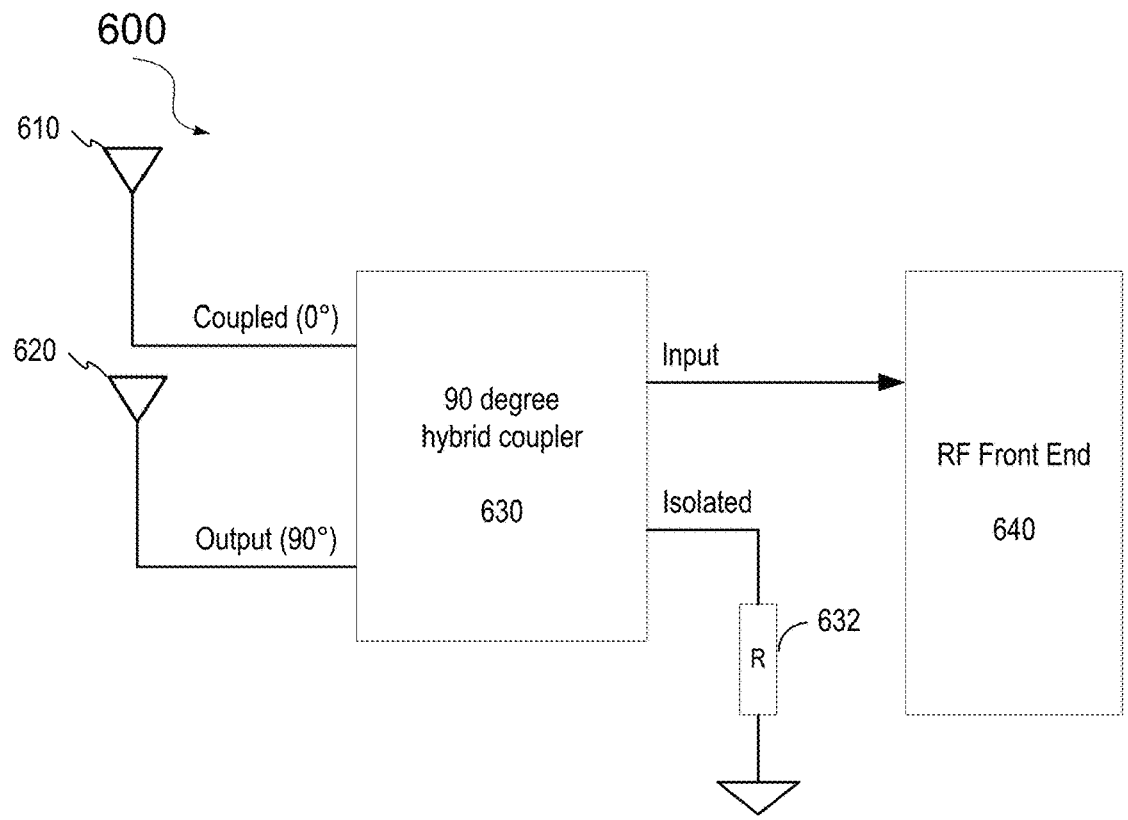
FIG. 6A illustrates an example of a circular polarization GNSS antenna according to certain embodiments.

FIG. 6A illustrates an example of a circular polarization GNSS receiver 600 according to certain embodiments. In the illustrated example, circular polarization GNSS receiver 600 may include a first linear polarization antenna 610, a second linear polarization antenna 620, a 90° hybrid coupler 630, and, optionally, an RF front end 640 or a portion of RF front end 640. First linear polarization antenna 610 and second linear polarization antenna 620 may have orthogonal polarizations. For example, first linear polarization antenna 610 may be a vertical linear polarization antenna, while second linear polarization antenna 620 may be a horizontal linear polarization antenna. First linear polarization antenna 610 and second linear polarization antenna 620 may be PIFAs that may be dedicated to GNSS or may be antennas that can be used for other radio technologies, such as WWAN, WLAN, WPAN, or the like, as described above and below. In the example shown in FIG. 6A, first linear polarization antenna 610 and second linear polarization antenna 620 may be dedicated antennas for GNSS and may cover GNSS L1, L2, and L5 frequency bands.

90° hybrid coupler 630 may be a passive device that has four ports and can be used as a splitter or a combiner. When used as a splitter, an input signal at the "Input" port may be split equally in power (−3 dB each) to two output ports referred to as the "Coupled" port and the "Output" port. The phase of the output signal at the "Output" port lags that of the output signal at the "Coupled" port by about 90°. No signal is coupled to the "Isolated" port, which may be terminated in 50Ω by a resistor 632. 90° hybrid coupler 630 is symmetrical, and thus the "Input" and "Isolated" ports can be reversed and the phase of the output signal at the "Coupled" port may lag that of the "Output" port by 90°. 90° hybrid coupler 630 may also be used in a reversed path as a combiner that combines input signals from the "Coupled" port and the "Output" port, where the output at the "Input" port may be about 3 dB higher than each input signal. Because of the different delays in the path from the "Coupled" port to the "Input" port and the path from the "Output" port to the "Input" port, synchronized linearly polarized inputs at the "Coupled" port and the "Output" port may be combined into an RHCP signal at the "Input" port (or an LHCP signal at the "Isolated" port).

In the illustrated example, first linear polarization antenna 610 (e.g., a vertical linear polarization PIFA) may be coupled to the "Coupled" port, while second linear polarization antenna 620 (e.g., a horizontal linear polarization PIFA) may be coupled to the "Output" port. As such, at the "Input" port, the combined signal may be 3 dB stronger as compared to the signals at the "Output" port and the "Coupled" port, and may be right-handed circularly polarized because the vertical polarization component may be 90° earlier that the horizontal polarization component. 90° hybrid coupler 630 may be referred to as a quadrature coupler, and may include, for example, a Lange coupler, a branch line coupler, an overlay coupler, an edge coupler, or a short-slot hybrid coupler. As described above, the actual phase shift or phase delay of a 90° hybrid coupler may be, for example, between about 90°±45°, between about 90°±30°, between about 90°±15°, between about 90°±10°, between about 90°±5°, or between about 90°±2°. In generally, the performance of circular polarization GNSS receiver 600 may be better when the phase delay is closer to 90° and may degrade when the phase delay deviates from 90°.

Figure 6B:
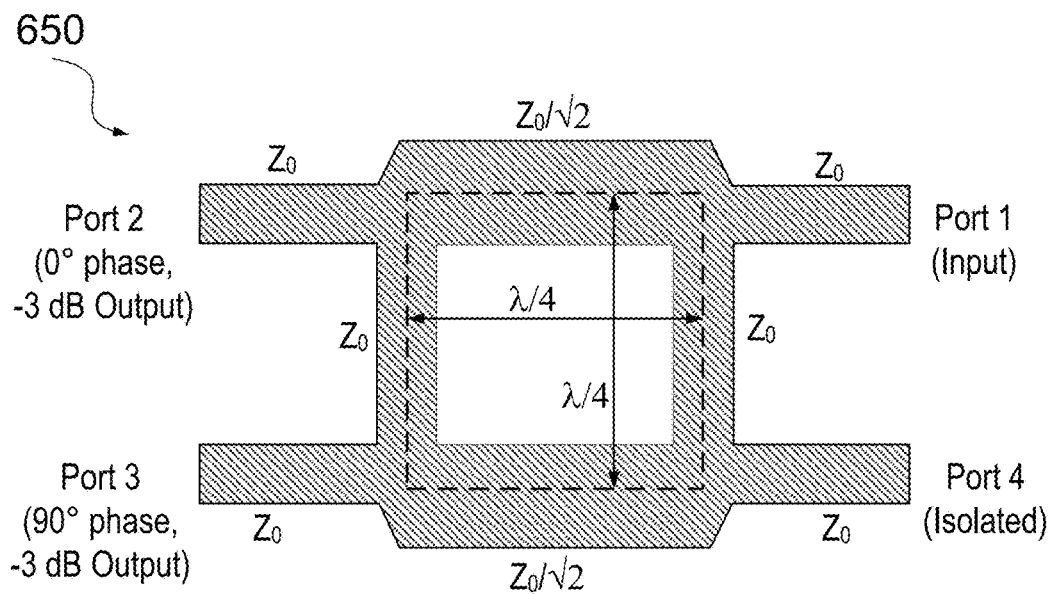
FIG. 6B illustrates an example of a 90° hybrid coupler.

FIG. 6B illustrates an example of a 90° hybrid coupler 650 implemented using a branch line coupler. 90° hybrid coupler 650 may be an example of 90° hybrid coupler 630. 90° hybrid coupler 650 may include four ports. When 90° hybrid coupler 650 is used as a splitter, port 1 is the input port, port 2 is the 0° output port, port 3 is the 90° output port, and port 4 is the isolated port. In the illustrated example, 90° hybrid coupler 650 is used as a combiner, where input signals are at port 2 and port 3 and are represented by vectors A and B, respectively. Thus, the output at port 1 may be represented by a vector $$\frac{\sqrt{2}}{2}(A\angle-90+B\angle-180).$$

When vectors A and B have the same amplitude, a gain of 3 dB in signal power may be achieved at port 1. Port 4 may be terminated with a 50Ω resistor.

The branch line coupler shown in FIG. 6B may be relatively easy to design and fabricate. It has two main transmission lines (horizontal in FIG. 6B) shunt-connected by two branch lines (vertical in FIG. 6B). The impedances and the dimensions of the transmission lines and the branch lines are shown in FIG. 6B. Branch line couplers are designed to be symmetrical as shown in FIG. 6B. Therefore, any of the ports can be used as an input port or an output port to achieve the same behavior.

90° hybrid couplers can be made very small. In one example, a 90° hybrid coupler may have a footprint of about 0.08×0.05 square inches with a height about 0.7 mm, which may be small enough to be designed into a smartphone PCB. The 90° hybrid coupler can have a frequency range that covers all GNSS constellations and can have a low insertion loss (e.g., <0.8 dB). The 90° hybrid coupler may also function as a filter to provide out-of-band rejection for frequencies, for example, above 2.7 GHz, and thus can eliminate the need of an additional filter in the front end.

FIG. 7 illustrates another example of a circular polarization GNSS receiver 700 according to certain embodiments. As with circular polarization GNSS receiver 600, circular polarization GNSS receiver 700 may include a first linear polarization antenna 710, a second linear polarization antenna 720, a 90° hybrid coupler 730, and, optionally, an RF front end 740 or a portion of RF front end 740. First linear polarization antenna 710 and second linear polarization antenna 720 may have orthogonal polarizations. For example, first linear polarization antenna 710 may be a vertical linear polarization antenna, while second linear polarization antenna 720 may be a horizontal linear polarization antenna. First linear polarization antenna 710 and second linear polarization antenna 720 may be PIFAs that may be dedicated to GNSS or may be antennas that can also be used for other radio technologies, such as WWAN, WLAN, WPAN, or the like, as described above. In the example shown in FIG. 7, first linear polarization antenna 710 and second linear polarization antenna 720 may be dedicated antennas for GNSS and may cover the GNSS L1, L5, and/or L2 frequency bands. 90° hybrid coupler 730 may be similar to 90° hybrid coupler 630, and may have two (input) ports connected to first linear polarization antenna 710 and second linear polarization antenna 720, one (output) port, and one (isolated) port terminated by a resistor 732.

Circular polarization GNSS receiver 700 may also include a diplexer 750 that can separate GNSS signals in different bands. In the illustrated example, diplexer 750 may include a splitter that splits the signal from the output port of 90° hybrid coupler 730 into two signals, and two filters that receive and filter the two signals. For example, a filter 752 may allow GNSS L1 signals to pass through, while a filter 754 may allow GNSS L5 signals to pass through. The separated GNSS L1 signal and GNSS L5 signal may then be processed by RF front end 740, the IF/BB signal processing section, and the navigation engine as described above with respect to, for example, FIG. 3.

As described above, smartphones may need to support multiple wireless communication technologies and frequency bands that cover a wide frequency range. Thus, it may be difficult to dedicate two PIFA antennas for GNSS in order to achieve the circular polarization. According to certain embodiments, at least one of the two antennas used to implement a circular polarization antenna for GNSS may be shared with other wireless communication technologies (e.g., WWAN or WLAN) through an antenna tuner, such as an aperture or impedance tuner. The antenna can be tuned to GNSS bands when a circular polarization antenna for GNSS is desired. Otherwise, the antenna can be tuned away from the GNSS bands and used as a linear polarization antenna for another wireless communication technology. Therefore, the two antennas may be dynamically configured and/or tuned to replicate a circular polarization antenna for receiving the RHCP GNSS signals, or to maintain a linear polarization for receiving GNSS signals or signals for other wireless communication technology, thus allowing a user to select the operational mode based on the environment and the desired accuracy. As a result, the GNSS receiver may be able to determine a position fix with good accuracy in many conditions using one linear polarization antenna, and may be able to get a more accurate position fix in certain environments by replicating a circular polarization antenna. For example, if the smartphone is in a situation where improved accuracy may be achieved, such as in an open sky environment, two antennas may be dynamically combined for GNSS purposes to achieve the additional 3 dB gain. In this way, both a linear polarization antenna and a circular polarization antenna can be implemented, without increasing the total number of antennas in a smartphone.

Figure 8:
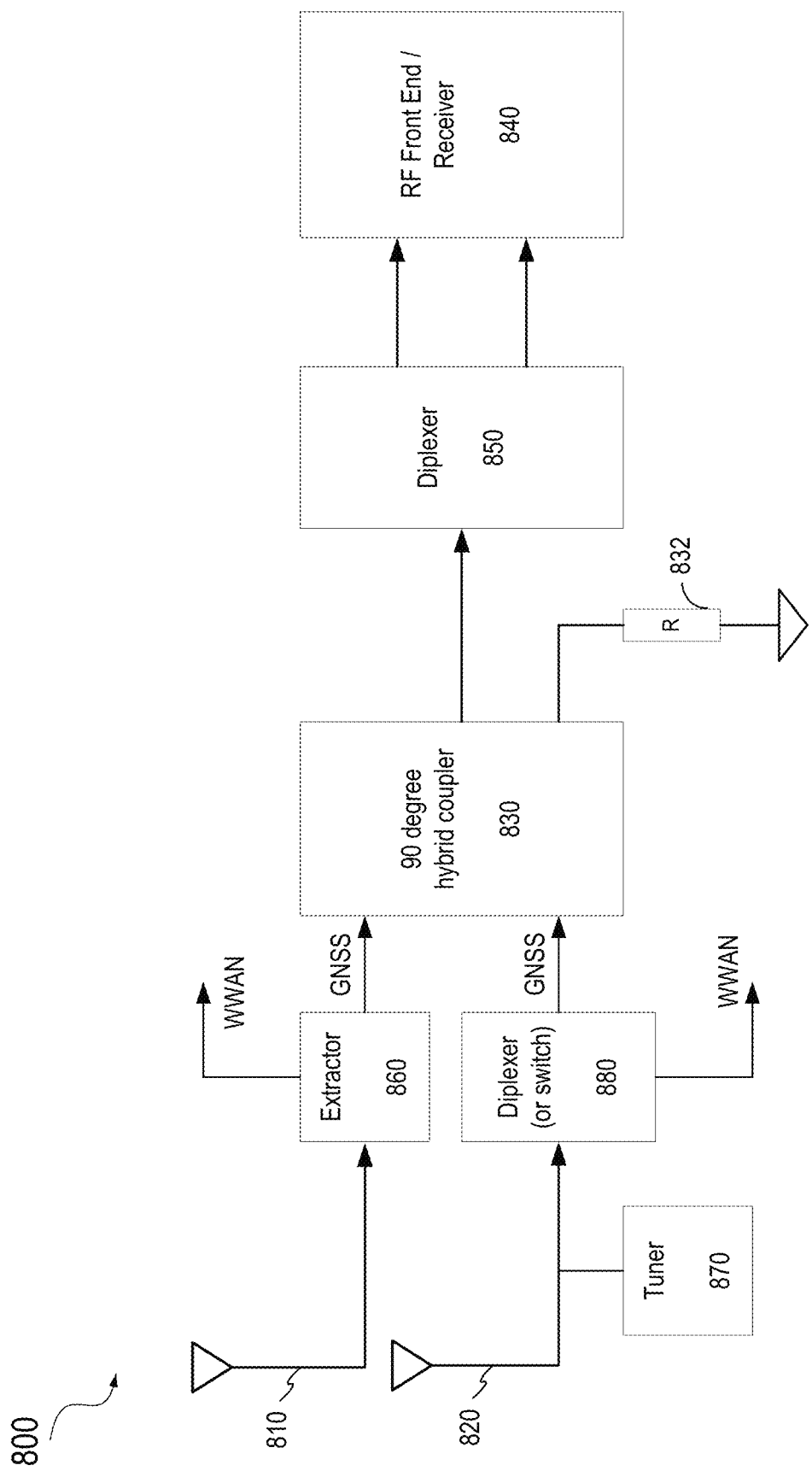
FIG. 8 illustrates an example of a polarization configurable GNSS smartphone antenna according to certain embodiments.

FIG. 8 illustrates an example of a polarization configurable GNSS receiver 800 according to certain embodiments. As with circular polarization GNSS receiver 600 or 700, polarization configurable GNSS receiver 800 may include a first linear polarization antenna 810, a second linear polarization antenna 820, a 90° hybrid coupler 830, an RF front end 840 or a portion of RF front end 840, and a diplexer 850. First linear polarization antenna 810 and second linear polarization antenna 820 may have orthogonal polarizations. For example, first linear polarization antenna 810 may be a vertical linear polarization antenna, while second linear polarization antenna 820 may be a horizontal linear polarization antenna. First linear polarization antenna 810 and second linear polarization antenna 820 may be PIFAs that may be dedicated to GNSS or may be antennas that have been used for other wireless communication technologies (or RATs), such as cellular, WiFi, WiMAX, or the like, as described above. 90° hybrid coupler 830 may be similar to 90° hybrid coupler 630 or 730, and may have two (input) ports connected to first linear polarization antenna 810 and second linear polarization antenna 820, one (output) port, and one (isolated) port terminated by a resistor 832. Diplexer 850 may be similar to diplexer 750 and may be used to separate GNSS signals in different bands, such as the GNSS L1 and GNSS L5 band.

In the example shown in FIG. 8, first linear polarization antenna 810 may be configured to receive GNSS and WWAN (e.g., GSM, CDMA, LTE, 5G NR, or WiMAX) signals. An extractor 860 (or another n-plexer, such as a diplexer) may be used to separate the GNSS signal and the WWAN signal. The GNSS signal from extractor 860 may be sent to a port (the 0° output port) of 90° hybrid coupler 830. The resonant frequency (having a certain bandwidth) of second linear polarization antenna 820 may be tuned to the GNSS band and/or a WWAN band by a tuner 870, such as an aperture tuner or an impedance tuner. The signal received by second linear polarization antenna 820 may be selected by a n-plexer (e.g., a diplexer 880 or an extractor) to separate the GNSS signal and the WWAN signal, or may be connected by a switch to either a port (the 90° output port) of 90° hybrid coupler 830 or a WWAN receiver. Extractor 860, tuner 870, and diplexer 880 may be designed such that the loss from first linear polarization antenna 810 to 90° hybrid coupler 830 and the loss from second linear polarization antenna 820 to 90° hybrid coupler 830 may be about the same and may be as low as possible.

To receive an RCHP GNSS signal, both first linear polarization antenna 810 and second linear polarization antenna 820 (tuned for GNSS) may be used, and the GNSS signals from extractor 860 and diplexer 880 may be sent to 90° hybrid coupler 830. In the event that a user, depending on the use case, may not need a circular polarization antenna, the user may tune second linear polarization antenna 820 to a band other than the GNSS bands by tuning tuner 870. For example, second linear polarization antenna 820 may be tuned to the WWAN band to improve the performance of the existing WWAN supported bands or generate a new resonant frequency range to support WWAN diversity. The received signal in the WWAN band may be isolated (disconnected) from 90° hybrid coupler 830 by, for example, a GNSS band filter in diplexer 880 or a switch.

As such, with the polarization configurable GNSS receiver, a user may use one linear polarization antenna for GNSS to achieve a good accuracy under certain conditions, such as conditions where there may be no line of sight signals. The user may also configure the antennas to a circular polarization GNSS receiver to achieve an improved accuracy under some conditions, such as in open and clear environments.

In some implementations, a smartphone or another portable device (e.g., a smart watch) may include software applications that may, based on the environment conditions, the device condition, or other inputs, determine whether it is appropriate to use a linear polarization antenna or a circular polarization antenna. For example, a software application may periodically gather information regarding the environment, the current device condition, certain user inputs, or the like, by polling various sensors. In some examples, sensors may report the condition changes to the software application. Based on the collected or reported information, the software application may determine that a linear polarization antenna or a circular polarization antenna may be appropriate, and may then control, for example, diplexer 880 or a switch to connect or disconnect a second linear polarization antenna (e.g., second linear polarization antenna 820) and a 90° hybrid coupler (e.g., 90° hybrid coupler 830), with little or no involvement of the user.

In one example, an antenna of a portable device may operate in the linear polarization mode (e.g., with one linear polarization antenna connected to the 90° hybrid coupler) before the software application determines that the portable device may have entered a high multipath environment. The software application may then determine that, because an RHCP antenna may have a better multipath rejection capability than a linear polarization antenna, an RHCP antenna may be needed in the current environment. The software application may then automatically connect a second linear polarization antenna to a second port of the 90° hybrid coupler to form an RHCP antenna as described above. In another example, the software application may determine that it may be more appropriate to use a linear polarization antenna in a particular operation condition, and thus may disconnect one of the two linear polarization antennas connected to the 90° hybrid coupler. In yet another example, the software application may determine that the portable device may have been plugged into a power source and thus the higher power consumption by an RHCP antenna may not be a concern, and may then automatically connect two linear polarization antennas to the 90° hybrid coupler to form an RHCP antenna. The software application may determine the appropriate antenna operation mode based on some other parameters, criteria, rules, or policies.

In some GNSS receivers, the antenna may be switched between the linear polarization mode and the RHCP mode, for example, at a start-up time, periodically, based on a pre-determined schedule, or upon detection of a change of environment. As described above, when the antenna is set to the linear polarization mode (e.g., using a single linear polarization antenna), the antenna may be able to detect both RHCP RF signals and LHCP RF signals. When the antenna is set to the RHCP mode (e.g., using two orthogonal linear polarization antennas and a 90° hybrid coupler described above), the antenna may receive RHCP RF signals, but may reject LHCP RF signals. Therefore, GNSS signals that are line-of-sight (LOS) signals or are reflected an even number of times (and thus are still RHCP signals) may be received by the antenna in either linear polarization mode or RHCP mode.

However, in an environment where there are multipath GNSS signals that are reflected an odd number of times and thus become LHCP signals, the antenna may detect the LHCP signals with a relatively high carrier-to-noise density ratio ($C/N_0$) when the antenna is set to the linear polarization mode, but may not detect the LHCP signals with a sufficiently high $C/N_0$ when the antenna is set to the RHCP mode. Therefore, by measuring GNSS signals in an environment using the antenna in both the linear polarization mode and the circular polarization mode, the presence of LHCP GNSS signals may be detected when the GNSS signals from a satellite are detected with a sufficiently high $C/N_0$ by the antenna in the linear polarization mode but are not detected with a sufficiently high $C/N_0$ by the antenna in the RHCP mode. The detection of the LHCP GNSS signals may indicate the presence of multipath GNSS signals or other non-line-of sight (NLOS) GNSS signals in the environment. In addition, the particular satellite whose signals are reflected an odd number of times and become LHCP signals at the GNSS receiver may be identified based on the information associated with the signals (e.g., identification of the satellite), and, in some implementations, the corresponding LHCP signals may not be used for positioning or may be given a low weight for positioning.

In one example, the antenna may first be set to the linear polarization mode (or the RHCP mode) to make one or more measurements. The antenna may then be configured to the RHCP mode as described above (or the linear polarization mode) to make one or more measurements. Based on the measurement results in the linear polarization mode and the RHCP mode, LHCP NLOS signals and/or the corresponding satellites may be identified as described above. The antenna may then be set to the linear polarization mode and take new measurements. The GNSS receiver may determine the position fix based on the new measurements, where signals from the identified satellites may not be used for the positioning or may be given a low weight for positioning. Because the antenna may consume more power in the RHCP mode than in the linear polarization mode, operating the antenna in this way may reduce the overall power consumption while achieving a relatively high positioning accuracy because LHCP NLOS signals are not relied on to determine the position fix.

In some applications, a higher position accuracy may be desired. The antenna may be set to the RHCP mode to reject NLOS signals such as the LHCP signals. In some environments, most GNSS signals may be LHCP signals. An RHCP antenna may only receive RHCP signals from a small number of satellites (e.g., fewer than three or four satellites) and thus the GNSS receiver may not be able to determine the position fix based on the received RHCP GNSS signals. In such environments, the antenna may be configured to a linear polarization antenna to receive signals for more satellites for positioning.

The information regarding the presence of NLOS signals in an environment and/or the information regarding the satellites whose transmitted signals become LHCP signals in the environment as determined by a GNSS receiver with the configurable antenna described herein may be used for other purposes. For example, the positioning system may use the information to estimate the position error or the integrity of the positioning, and may, for example, use the Stanford Diagram to determine misleading information, hazardous misleading information, or system unavailable condition. In some embodiments, the information may be crowdsourced or otherwise shared with other devices that may or may not have the capability of detecting NLOS signals. In some embodiments, a GNSS receiver may determine that it may not be able to receive LOS signals from a sufficiently large number (e.g., more than 3 or 4) of satellites in a certain environment, and may communicate with a positioning system such that the positioning system may determine the position fix using other techniques. For example, the positioning system may choose to use other information, such as WiFi or WLAN signals, rather than the GNSS signals, for positioning. In some embodiments, the positioning system may choose to use other techniques, such as dead reckoning techniques, for positioning.

Figure 9:
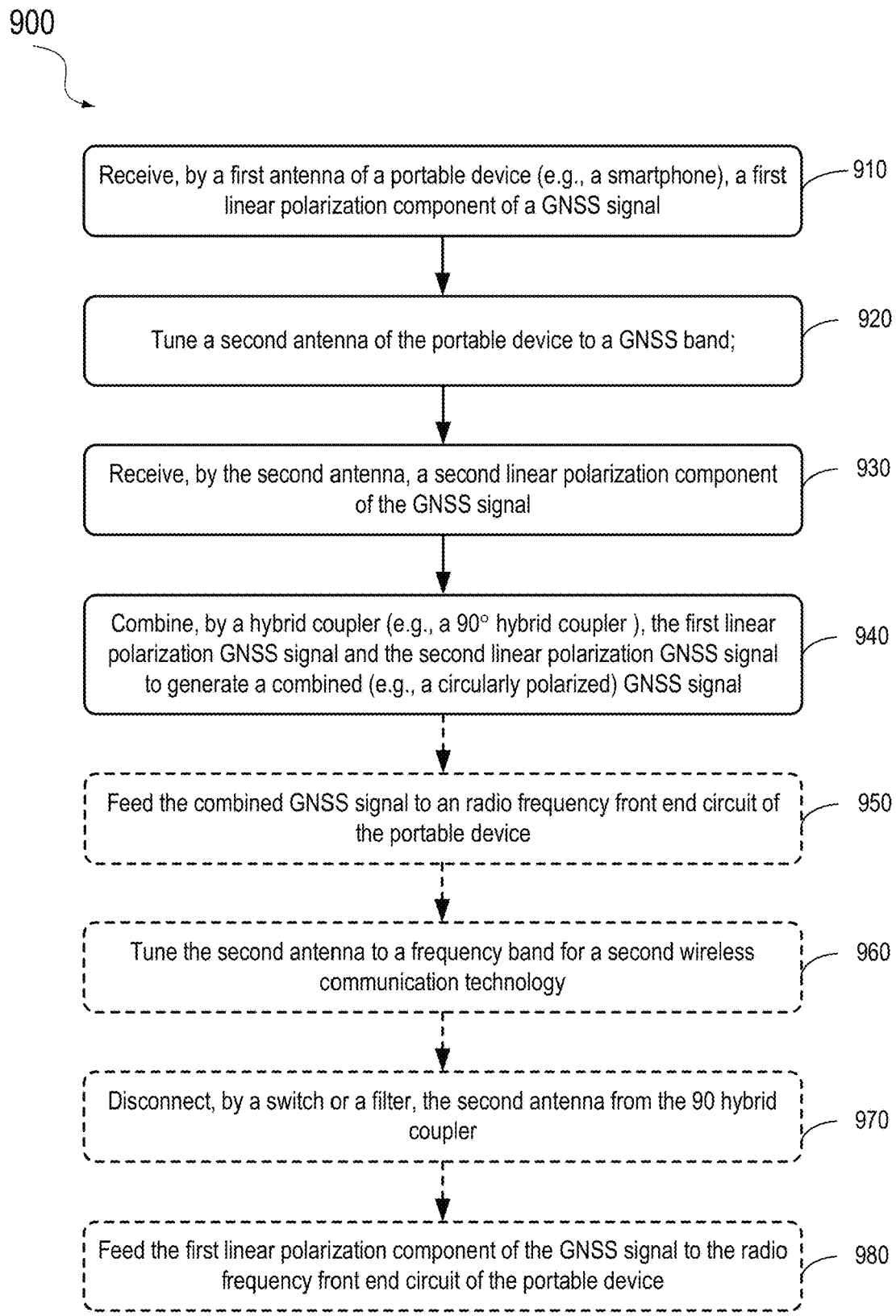
FIG. 9 is a flowchart illustrating an example of a method of configuring a polarization configurable GNSS receiver according to certain embodiments.
Figure 10:
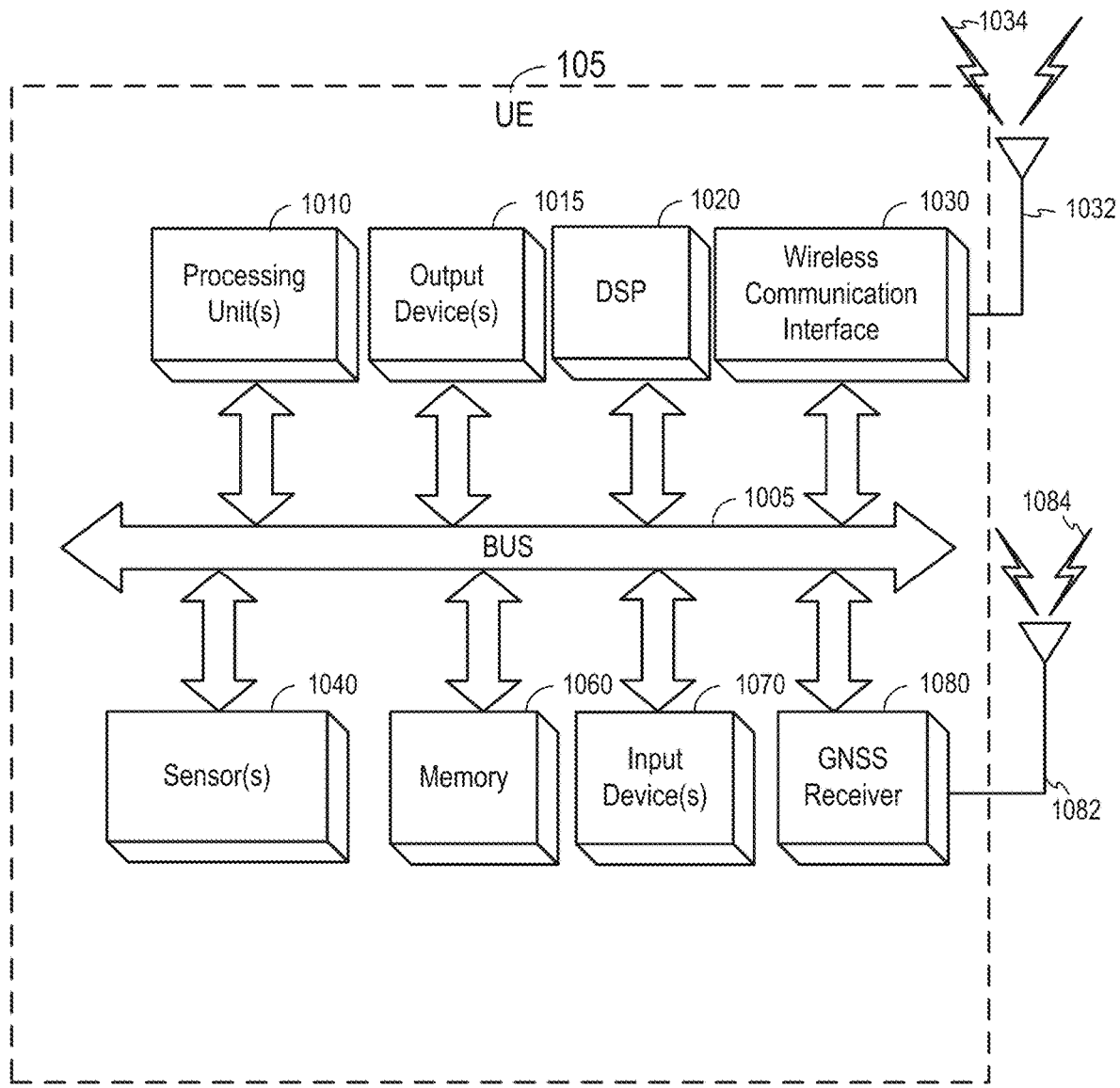
FIG. 10 illustrates an example of a user equipment (UE) according to certain embodiments.

FIG. 9 is a flowchart 900 illustrating an example of a method of configuring a polarization configurable GNSS receiver according to certain embodiments. It is noted that the operations illustrated in FIG. 9 provide particular positioning techniques to detect and mitigate the impact of spoofing signals on the positioning. Other sequences of operations can also be performed according to alternative embodiments. For example, alternative embodiments may perform the operation in a different order. Moreover, the individual operations illustrated in FIG. 9 can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives. In various embodiments, the means for performing the functionality illustrated in flowchart 900 may include, for example, a GNSS receiver and/or a processing unit on a UE or a vehicle described herein, which may include hardware and/or software components for performing the described functionality. For example, means for performing the operations in flowchart 900 may include various components of a GNSS receiver or a UE, such as the PIFAs, 90° hybrid couplers, n-plexers (e.g., diplexers, extractors, or switches), tuners, RF front end circuits, IF/BB signal processing section, and/or navigation engines of GNSS receiver 300, GNSS receiver 600, 700, or 800, or antenna 1082, GNSS receiver 1080, processing unit(s) 1010, bus 1005, and memory 1060 of UE 105 as illustrated in FIG. 10 below.

At block 910, a first antenna of a portable device (e.g., a smartphone), may receive a first linear polarization component of a GNSS signal. The first antenna may include a PIFA antenna or another antenna with a small footprint and a low height profile. The first antenna may be a linear polarization antenna, such as a vertical linear polarization antenna configured to receive vertical linear polarization RF signals. In some embodiments, the first antenna may also receive an RF signal in a second wireless communication technology, such as a WWAN technology (e.g., GSM, CDMA, LTE, 5G NR, or WiMAX), a WLAN technology (e.g., WiFi), or a WPAN technology (e.g., Bluetooth or ZigBee). An n-plexer, such as a diplexer or an extractor may be used to separate the first linear polarization component of the GNSS signal and the RF signal in the second wireless communication technology.

At block 920, a tuner may tune a second antenna of the portable device to a GNSS band. The second antenna may also be a PIFA and may be a linear polarization antenna. The tuner may include, for example, an aperture tuner or an impedance tuner that can tune the resonant frequency of the second antenna to the GNSS band or another frequency band for a different wireless communication technology, such as another WWAN, WLAN, WPAN technology. The tuner may tune the second antenna to the GNSS band when, for example, the portable device is in open sky or clear environments.

At block 930, the second antenna tuned to the GNSS band may receive a second linear polarization component of the GNSS signal. The second linear polarization component of the GNSS signal may include, for example, a horizontal linear polarization component of the GNSS signal. In some embodiments, the second antenna may be tuned to both the GNSS band and the frequency band for the different wireless communication technology, and an n-plexer (e.g., a diplexer or an extractor) may be used to separate the second linear polarization component of the GNSS signal and an RF signal of the different wireless communication technology.

At block 940, a hybrid coupler (e.g., a 90° hybrid coupler) may combine the first linear polarization component of the GNSS signal and the second linear polarization component of the GNSS signal to generate a combined (e.g., circularly polarized) GNSS signal. The combined GNSS signal may have a power that is about 3 dB higher than the power of the first linear polarization component of the GNSS signal or the second linear polarization component of the GNSS signal. Thus, the first antenna, the second antenna, and the hybrid coupler may form a circular polarization antenna, which may also reject LHCP signals caused by the reflection of RHCP signals transmitted by GNSS satellites. As a result, a more accurate position fix of the portable device may be determined by the GNSS receiver. The hybrid coupler may include, for example, a branch line coupler, a Lange coupler, an overlay coupler, an edge coupler, or a short-slot hybrid coupler.

Optionally, at block 950, the hybrid coupler may feed the combined GNSS signal to an radio frequency front end circuit of the portable device. In some embodiments, an n-plexer, such as a diplexer or a triplexer, may separate GNSS signals in different bands, such as L1, L5, and/or L2 bands, and then send the GNSS signals in different bands to the RF radio frequency front end circuit.

Optionally, at block 960, the tuner may tune the second antenna to a frequency band for a second wireless communication technology when, for example, a good position fix is sufficient for the user application. At block 970, a switch or a filter (e.g., a filter in a diplexer) may disconnect or isolate the second antenna from the hybrid coupler, such that the hybrid coupler may not receive signals from the second antenna. Thus, the first antenna and the hybrid coupler may function as a linear polarization GNSS receiver. At block 980, the hybrid coupler may feed the first linear polarization component of the GNSS signal to the radio frequency front end circuit of the portable device. In this way, the first antenna, the second antenna (including the tuner and/or the n-plexer), and the hybrid coupler may form a polarization configurable GNSS receiver that can be tuned to receiver circular polarization GNSS signals or linear polarization components of GNSS signals based on the environment, specific use cases, or the desired accuracy.

FIG. 10 illustrates an embodiment of a UE 105, which can be utilized as described herein above (e.g., in association with FIGS. 1-9). For example, the UE 105 can perform one or more of the functions of the method shown in FIG. 9. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 10.

The UE 105 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, application specific integrated circuits (ASICs), and/or the like), and/or other processing structures or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). The UE 105 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 105 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. As such, the wireless communication interface 1030 can include RF circuitry capable of being tuned between an active BWP and one or additional bands having one or more FLs used for PRS signals, as described herein. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1080 capable of receiving signals 1084 from one or more GNSS satellites using an antenna 1082 (which could be the same as wireless communication antenna 1032). Positioning based on GNSS signal measurement can be utilized to complement and/or incorporate the techniques described herein. The GNSS receiver 1080 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1010, DSP 1020, and/or a processing unit within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1010 or DSP 1020.

The UE 105 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 105 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 105 (and/or processing unit(s) 1010 or DSP 1020 within UE 105). In an aspect, then such code and/or instructions can be used to configure and/or adapt a general-purpose computer (or other device) to perform one or more operations in accordance with the described methods.

Figure 11:
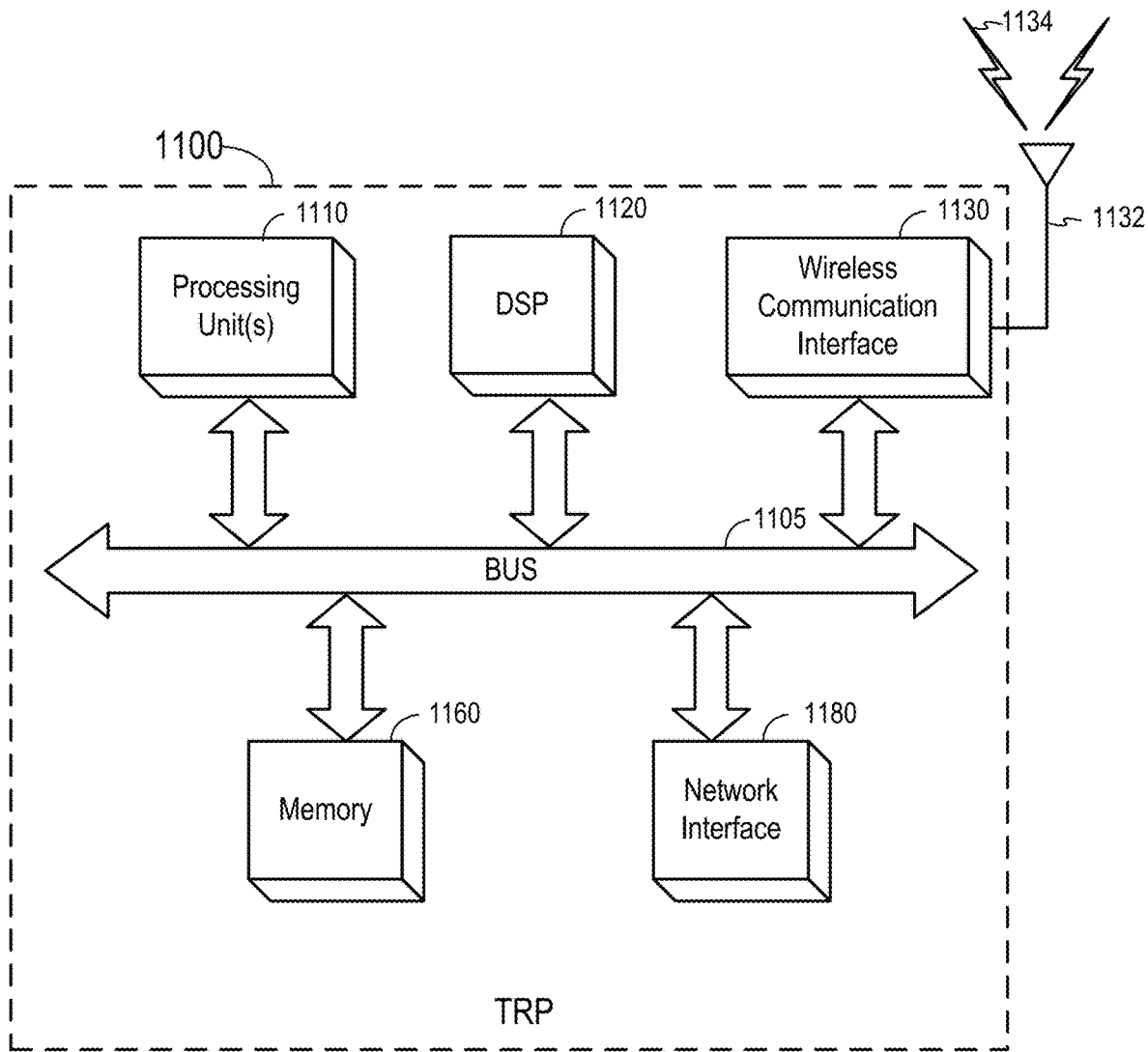
FIG. 11 illustrates an example of a transmission reception point (TRP) according to certain embodiments.

FIG. 11 illustrates an embodiment of a TRP 1100, which can be utilized as described herein above (e.g., in association with FIGS. 1-6). It should be noted that FIG. 11 is meant only to provide a generalized illustration of various components, any or all of which may be utilized as appropriate.

The TRP 1100 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below), according to some embodiments. The TRP 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1100 to communicate as described herein. The wireless communication interface 1130 may permit data and signaling to be communicated (e.g., transmitted and received) to UEs, other base stations/ TRPs (e.g., eNBs, gNBs, and ng-eNBs), and/or other network components, computer systems, and/or any other electronic devices described herein. The communication can be carried out via one or more wireless communication antenna(s) 1132 that send and/or receive wireless signals 1134.

The TRP 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the TRP 1100 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the TRP 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the TRP 1100 (and/or processing unit(s) 1110 or DSP 1120 within TRP 1100). In an aspect, then such code and/or instructions can be used to configure and/or adapt a general-purpose computer (or other device) to perform one or more operations in accordance with the described methods.

Figure 12:
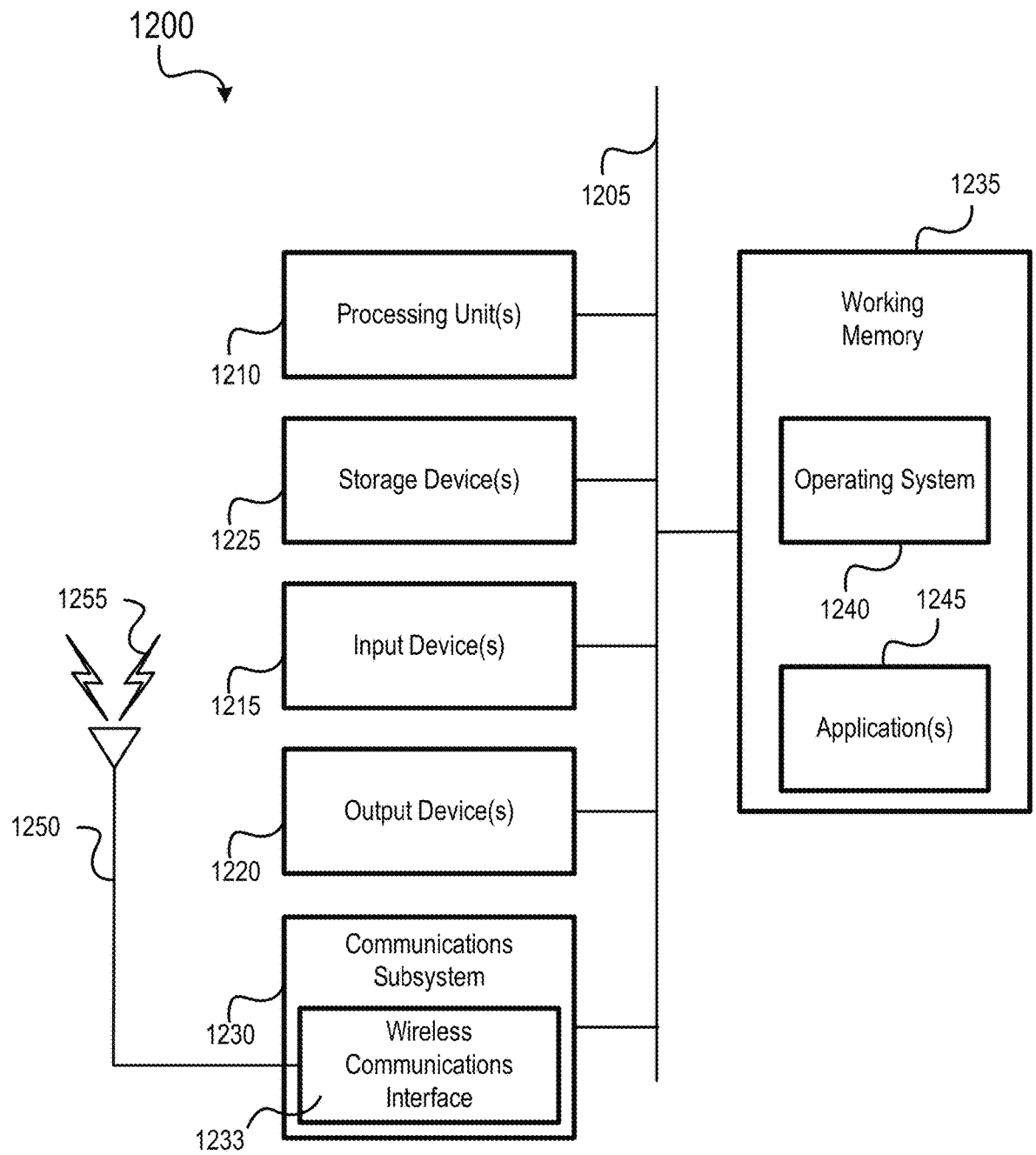
FIG. 12 is a block diagram of an example of a computer system according to certain embodiments.

FIG. 12 is a block diagram of an embodiment of a computer system 1200, which may be used, in whole or in part, to provide the functions of one or more network components as described in the embodiments herein (e.g., location server 160 of FIG. 1, LMF 220 of FIG. 2, etc.). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any (reasonable) combination of A, B, and/or C, such as AC, AB, BC, AA, AAB, ABC, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A Global Navigation Satellite System (GNSS) receiver comprising: a first linear polarization antenna configured to receive a first linear polarization component of a GNSS signal; a second linear polarization antenna configurable to receive a second linear polarization component of the GNSS signal, a radio frequency signal conforming to a second wireless communication technology, or both; and a hybrid coupler including: a first port electrically coupled to the first linear polarization antenna; a second port electrically coupled to the second linear polarization antenna; and a third port outputting a combined GNSS signal of the first linear polarization component of the GNSS signal and the second linear polarization component of the GNSS signal, wherein a difference between a phase delay from the second port to the third port and a phase delay from the first port to the third port is between 60° and 120°.

Clause 2: The GNSS receiver of clause 1, wherein the first linear polarization antenna and the second linear polarization antenna are planar inverted F antennas.

Clause 3: The GNSS receiver of any of clauses 1-2, wherein: the first linear polarization antenna is configured to receive a radio frequency signal conforming to a third wireless communication technology; and the GNSS receiver comprises a demultiplexing circuit coupled to the first linear polarization antenna and configured to separate the first linear polarization component of the GNSS signal and the radio frequency signal conforming to the third wireless communication technology.

Clause 4: The GNSS receiver of clause 3, wherein the demultiplexing circuit comprises an n-plexer with n greater than one.

Clause 5: The GNSS receiver of clause 3, wherein the demultiplexing circuit comprises a first bandpass filter configured to select the first linear polarization component of the GNSS signal and a second bandpass filter configured to select the radio frequency signal conforming to the third wireless communication technology.

Clause 6: The GNSS receiver of any of clauses 1-5, wherein the second linear polarization antenna comprises a tuner configured to tune a resonant frequency of the second linear polarization antenna to receive the second linear polarization component of the GNSS signal, the radio frequency signal conforming to the second wireless communication technology, or both.

Clause 7: The GNSS receiver of clause 6, wherein the tuner comprises an aperture tuner or an impedance tuner.

Clause 8: The GNSS receiver of any of clauses 1-7, further comprising a switch between the second linear polarization antenna and the second port of the hybrid coupler, the switch configurable to connect or disconnect the second linear polarization antenna and the hybrid coupler.

Clause 9: The GNSS receiver of any of clauses 1-7, further comprising an n-plexer between the second linear polarization antenna and the second port of the hybrid coupler, the n-plexer configured to: separate the second linear polarization component of the GNSS signal and the radio frequency signal conforming to the second wireless communication technology; and send the second linear polarization component of the GNSS signal to the second port of the hybrid coupler.

Clause 10: The GNSS receiver of any of clauses 1-9, further comprising an n-plexer coupled to the third port of the hybrid coupler and configured to separate GNSS L1 signals and GNSS L5 signals.

Clause 11: The GNSS receiver of any of clauses 1-10, wherein the second wireless communication technology comprises a wireless wide area network (WWAN) technology, a wireless local area network (WLAN) technology, or a wireless personal area network (WPAN) technology.

Clause 12: The GNSS receiver of any of clauses 1-11, wherein: the first linear polarization antenna includes a vertical linear polarization antenna; and the second linear polarization antenna includes a horizontal linear polarization antenna.

Clause 13: The GNSS receiver of any of clauses 1-12, wherein the third port of the hybrid coupler outputs a right-handed circularly polarized GNSS signal.

Clause 14: A method comprising: receiving, by a first antenna of a portable device, a first linear polarization component of a GNSS signal; tuning a second antenna of the portable device to a GNSS band; receiving, by the second antenna, a second linear polarization component of the GNSS signal; and combining, by a hybrid coupler, the first linear polarization component of the GNSS signal and the second linear polarization component of the GNSS signal to generate a combined GNSS signal.

Clause 15: The method of clause 14, further comprising: tuning the second antenna to a frequency band for a second wireless communication technology that is different from GNSS technology; disconnecting, by a switch or a filter, the second antenna from the hybrid coupler; and feeding the combined GNSS signal and the first linear polarization component of the GNSS signal to a radio frequency front end circuit of the portable device.

Clause 16: The method of clause 15, wherein the second wireless communication technology comprises a wireless wide area network (WWAN) technology, a wireless local area network (WLAN) technology, or a wireless personal area network (WPAN) technology.

Clause 17: The method of clause 14, wherein: tuning the second antenna comprises tuning the second antenna to receive both the second linear polarization component of the GNSS signal and a radio frequency signal conforming to a second wireless communication technology; and the method further comprises separating the second linear polarization component of the GNSS signal and the radio frequency signal conforming to the second wireless communication technology.

Clause 18: The method of clause 14, further comprising: receiving, by the first antenna, a radio frequency signal conforming to a third wireless communication technology; and separating the first linear polarization component of the GNSS signal and the radio frequency signal conforming to the third wireless communication technology.

Clause 19: The method of clause 18, wherein the third wireless communication technology comprises a wireless wide area network (WWAN) technology, a wireless local area network (WLAN) technology, or a wireless personal area network (WPAN) technology.

Clause 20: The method of any of clauses 14-19, wherein combining the first linear polarization component of the GNSS signal and the second linear polarization component of the GNSS signal comprises delaying the second linear polarization component of the GNSS signal by a phase delay within +90±30° or within −90±30° with respect to the first linear polarization component of the GNSS signal.

Clause 21: The method of any of clauses 14-20, further comprising automatically switching, based on an environment condition, an operating condition, or both of the portable device, a switch between the second antenna and the hybrid coupler to connect or disconnect the second antenna and the hybrid coupler.

Clause 22: The method of any of clauses 14-21, further comprising: disconnecting the second antenna from the hybrid coupler; measuring, using the first antenna, a first set of one or more GNSS signals; connecting the second antenna to the hybrid coupler; measuring, using the first antenna and the second antenna, a second set of one or more GNSS signals; and identifying a GNSS signal in the first set of one or more GNSS signals but not in the second set of one or more GNSS signals as a multipath GNSS signal.

Clause 23: The method of clause 22, further comprising identifying a first satellite associated with the multipath GNSS signal.

Clause 24: The method of clause 23, further comprising: disconnecting the second antenna from the hybrid coupler; measuring, using the first antenna, a third set of GNSS signals that includes a GNSS signal from the first satellite; and determining a location fix based on the third set of GNSS signals excluding the GNSS signal from the first satellite.

Clause 25: A portable device comprising: means for receiving a first linear polarization component of a Global Navigation Satellite System (GNSS) signal; means for tuning an antenna of the portable device to a GNSS band to receive a second linear polarization component of the GNSS signal; and means for combining the first linear polarization component of the GNSS signal and the second linear polarization component of the GNSS signal to generate a circularly polarized GNSS signal.

Clause 26: The portable device of clause 25, further comprising: means for tuning the antenna to a frequency band for a second wireless communication technology that is different from GNSS technology; means for disconnecting the antenna from the means for combining the first linear polarization component of the GNSS signal and the second linear polarization component of the GNSS signal; and means for feeding the first linear polarization component of the GNSS signal or the circularly polarized GNSS signal to a radio frequency front end circuit of the portable device.

Clause 27: The portable device of clause 26, wherein the second wireless communication technology comprises a wireless wide area network (WWAN) technology, a wireless local area network (WLAN) technology, or a wireless personal area network (WPAN) technology.

Clause 28: The portable device of clause 25, wherein: the means for tuning the antenna comprises means for tuning the antenna to both the GNSS band and a frequency band for a second wireless communication technology; and the portable device further comprises means for separating the second linear polarization component of the GNSS signal and a radio frequency signal conforming to the second wireless communication technology.

Clause 29: The portable device of clause 25, wherein: the means for receiving the first linear polarization component of the GNSS signal is further configured to receive a radio frequency signal conforming to a second wireless communication technology; and the portable device further comprises means for separating the first linear polarization component of the GNSS signal and the radio frequency signal conforming to the second wireless communication technology.

Clause 30: A Global Navigation Satellite System (GNSS) receiver comprising: a first linear polarization antenna configured to receiver a first linear polarization component of a GNSS signal; a second linear polarization antenna; a tuner configurable to tune the second linear polarization antenna to a GNSS band to receive a second linear polarization component of the GNSS signal; and a hybrid coupler configured to combine the first linear polarization component of the GNSS signal and the second linear polarization component of the GNSS signal to generate a circularly polarized GNSS signal.

Clause 31: The GNSS receiver of clause 30 wherein: the tuner is configurable to tune the second linear polarization antenna to a frequency band for a second wireless communication technology that is different from GNSS technology; and the GNSS receiver further comprises a switch or a filter configured to disconnect the second linear polarization antenna from the hybrid coupler.

Clause 32: The GNSS receiver of clause 30, wherein: the tuner is configurable to tune the second linear polarization antenna to receive both the second linear polarization component of the GNSS signal and a radio frequency signal conforming to a second wireless communication technology; and the GNSS receiver comprises an n-plexer configured to separate the second linear polarization component of the GNSS signal and the radio frequency signal conforming to the second wireless communication technology.

Clause 33: The GNSS receiver of clause 30, wherein: the first linear polarization antenna is configured to receive a radio frequency signal conforming to a second wireless communication technology; and the GNSS receiver comprises an n-plexer configured to separate the first linear polarization component of the GNSS signal and the radio frequency signal conforming to the second wireless communication technology.

What is claimed is:

1. A Global Navigation Satellite System (GNSS) receiver comprising:
   a first linear polarization antenna configured to receive a radio frequency signal conforming to a first wireless communication technology, wherein the radio frequency signal conforming to the first wireless communication technology includes a first linear polarization component of a GNSS signal;
   a second linear polarization antenna configurable to receive, based on an operation condition associated with the GNSS receiver, a second linear polarization component of the GNSS signal, and a radio frequency signal conforming to a second wireless communication technology;
   a hybrid coupler including:
      a first port electrically coupled to the first linear polarization antenna;
      a second port electrically coupled to the second linear polarization antenna; and
      a third port configurable to output a combined GNSS signal of the first linear polarization component of the GNSS signal and the second linear polarization component of the GNSS signal to a radio frequency (RF) receiver,
      wherein a difference between a phase delay from the second port to the third port and a phase delay from the first port to the third port is between 60° and 120°; and
   an n-plexer between the second linear polarization antenna and the second port of the hybrid coupler, the n-plexer configured to: separate the second linear polarization component of the GNSS signal and the radio frequency signal conforming to the second wireless communication technology, and send the second linear polarization component of the GNSS signal directly to the second port of the hybrid coupler and not directly to the RF receiver.

2. The GNSS receiver of claim 1, wherein the first linear polarization antenna and the second linear polarization antenna are planar inverted F antennas.

3. The GNSS receiver of claim 1, wherein:
   the first linear polarization antenna is configured to receive a radio frequency signal conforming to a third wireless communication technology; and
   the GNSS receiver comprises a demultiplexing circuit coupled to the first linear polarization antenna and configured to separate the first linear polarization component of the GNSS signal and the radio frequency signal conforming to the third wireless communication technology.

4. The GNSS receiver of claim 3, wherein the demultiplexing circuit comprises an n-plexer with n greater than one.

5. The GNSS receiver of claim 3, wherein the demultiplexing circuit comprises a first bandpass filter configured to select the first linear polarization component of the GNSS signal and a second bandpass filter configured to select the radio frequency signal conforming to the third wireless communication technology.

6. The GNSS receiver of claim 1, wherein the second linear polarization antenna comprises a tuner configured to tune a resonant frequency band of the second linear polarization antenna to receive the second linear polarization component of the GNSS signal, the radio frequency signal conforming to the second wireless communication technology, or both.

7. The GNSS receiver of claim 6, wherein the tuner comprises an aperture tuner or an impedance tuner.

8. The GNSS receiver of claim 1, further comprising a switch between the second linear polarization antenna and the second port of the hybrid coupler, the switch configurable to connect or disconnect the second linear polarization antenna and the hybrid coupler while maintaining a connection between the first linear polarization antenna and the hybrid coupler.

9. The GNSS receiver of claim 1, further comprising an n-plexer coupled to the third port of the hybrid coupler and configured to separate GNSS L1 signals and GNSS L5 signals.

10. The GNSS receiver of claim 1, wherein the second wireless communication technology comprises a wireless wide area network (WWAN) technology, a wireless local area network (WLAN) technology, or a wireless personal area network (WPAN) technology.

11. The GNSS receiver of claim 1, wherein:
the first linear polarization antenna includes a vertical polarization antenna; and
the second linear polarization antenna includes a horizontal polarization antenna.

12. The GNSS receiver of claim 1, wherein the third port of the hybrid coupler outputs a right-handed circularly polarized GNSS signal.

13. The GNSS receiver of claim 1, wherein the operation condition is based on an environment condition, a device condition, a user input, or a combination thereof.

14. The GNSS receiver of claim 1, wherein the second linear polarization antenna is further configurable to, based on the operation condition associated with the GNSS receiver, provide the second linear polarization component to the second port for the combined GNSS signal, or use the radio frequency signal conforming to the second wireless communication technology.

15. The GNSS receiver of claim 1, wherein the hybrid coupler is configurable to be disconnected from the second linear polarization antenna based on the operation condition associated with the GNSS receiver.

16. A Global Navigation Satellite System (GNSS) receiver comprising:
a first linear polarization antenna configured to receive a first linear polarization component of a GNSS signal;
a second linear polarization antenna;
a tuner configurable to tune the second linear polarization antenna to a GNSS band to receive a second linear polarization component of the GNSS signal and a radio frequency signal conforming to a second wireless communication technology;
a hybrid coupler configured to, based on a first operation condition associated with the GNSS receiver, combine the first linear polarization component of the GNSS signal and the second linear polarization component of the GNSS signal to generate a circularly polarized GNSS signal, or based on a second operation condition associated with the GNSS receiver, use the first linear polarization component of the GNSS signal to generate a linearly polarized GNSS signal; and
an n-plexer configured to separate the second linear polarization component of the GNSS signal and the radio frequency signal conforming to the second wireless communication technology, and send the second linear polarization component of the GNSS signal directly to the hybrid coupler and not directly to a radio frequency (RF) receiver.

17. The GNSS receiver of claim 16, wherein:
the tuner is configurable to tune the second linear polarization antenna to a frequency band for a second wireless communication technology that is different from GNSS technology; and
the GNSS receiver further comprises a switch or a filter configured to disconnect the second linear polarization antenna from the hybrid coupler.

18. The GNSS receiver of claim 16, wherein:
the first linear polarization antenna is configured to receive the radio frequency signal conforming to the second wireless communication technology; and
the GNSS receiver comprises an n-plexer configured to separate the first linear polarization component of the GNSS signal and the radio frequency signal conforming to the second wireless communication technology.

19. The GNSS receiver of claim 16, wherein the first operation condition and the second operation condition are based on different environment conditions, device conditions, user inputs, or a combination thereof.

* * * * *